United States Patent
Xu et al.

(10) Patent No.: US 11,570,484 B2
(45) Date of Patent: *Jan. 31, 2023

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US); Xiang Li, Saratoga, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,823

(22) Filed: Sep. 2, 2021

(65) Prior Publication Data

US 2021/0400312 A1 Dec. 23, 2021

Related U.S. Application Data

(63) Continuation of application No. 16/528,148, filed on Jul. 31, 2019, now Pat. No. 11,172,236.

(Continued)

(51) Int. Cl.
 *H04N 19/96* (2014.01)
 *H04N 19/44* (2014.01)
 (Continued)

(52) U.S. Cl.
 CPC ........... *H04N 19/96* (2014.11); *H04N 19/132* (2014.11); *H04N 19/159* (2014.11); *H04N 19/176* (2014.11); *H04N 19/44* (2014.11)

(58) Field of Classification Search
 CPC ..... H04N 19/176; H04N 19/159; H04N 19/96
 See application file for complete search history.

(56) References Cited

U.S. PATENT DOCUMENTS

| | | |
|---|---|---|
| 2007/0110325 A1 | 5/2007 | Lee |
| 2015/0103915 A1 | 4/2015 | Xu |

(Continued)

FOREIGN PATENT DOCUMENTS

| | | |
|---|---|---|
| EP | 3058739 A1 | 8/2016 |
| JP | 2016534660 A | 3/2015 |

(Continued)

OTHER PUBLICATIONS

Japanese Office Action dated Jan. 6, 2022 in Application No. 2021-512374 with English Translation.

(Continued)

*Primary Examiner* — Zhubing Ren
(74) *Attorney, Agent, or Firm* — ArentFox Schiff LLP

(57) ABSTRACT

A method and an apparatus for video decoding are disclosed. The apparatus decodes prediction information of a current block from a coded video bitstream. The prediction information indicates an intra block copy mode. The current block is one of a plurality of coding blocks in a current region of a current coding tree block (CTB) in a current picture. The apparatus determines whether the current block is to be reconstructed first in the current region. When the current block is to be reconstructed first in the current region, the apparatus determines a block vector for the current block where a reference block indicated by the block vector is in a search range in the current picture that excludes a collocated region in a previously reconstructed CTB. A position of the collocated region in the previously reconstructed CTB has a same relative position as the current region in the current CTB.

16 Claims, 18 Drawing Sheets

Related U.S. Application Data

(60) Provisional application No. 62/816,125, filed on Mar. 9, 2019, provisional application No. 62/735,002, filed on Sep. 21, 2018.

(51) Int. Cl.
*H04N 19/176* (2014.01)
*H04N 19/159* (2014.01)
*H04N 19/132* (2014.01)

(56) References Cited

U.S. PATENT DOCUMENTS

| | | | |
|---|---|---|---|
| 2015/0264372 A1 | 9/2015 | Kolesnikov | |
| 2015/0373358 A1 | 12/2015 | Pang et al. | |
| 2015/0373366 A1* | 12/2015 | He | H04N 19/70 375/240.16 |
| 2016/0227238 A1 | 8/2016 | Wu | |
| 2016/0227244 A1 | 8/2016 | Rosewarne | |
| 2016/0255344 A1* | 9/2016 | Lee | H04N 19/157 375/240.13 |
| 2017/0310961 A1* | 10/2017 | Liu | H04N 19/46 |
| 2018/0288430 A1 | 10/2018 | Chen et al. | |

FOREIGN PATENT DOCUMENTS

| | | |
|---|---|---|
| JP | 2016539542 A | 12/2016 |
| JP | 2017525267 A | 8/2017 |
| RU | 2654129 C2 | 5/2018 |
| RU | 2679201 C2 | 2/2019 |
| WO | 2015054811 A1 | 4/2015 |
| WO | 2020113156 A1 | 6/2020 |

OTHER PUBLICATIONS

Alshina E et al., "Ahg5: Intra block copy within one LCU", 15 JCT-VC Meeting; Oct. 23, 2013-Nov. 1, 2013; Geneva; (Joint Collaborate Team on Video Coding of ISO/IEC JTC1/SC29/WG11 and ITU-T SG.16), No. JCTVC-O0074, Oct. 26, 2013, 7 pages.
Zhou, Minhua, SCCE1: Cross-verification of test1.2 results, Joint Collaborative Team on Video Coding (JCT-VC) of ITU-T SG 16 WP 3 and ISO / IEC JTC 1 / SC 29/WG 11 18th Meeting: Sapporo, JP, Jun. 30-Jul. 9, 2014, JCTVC-R0211], JCTVC-R0211 (version 1), ITU-T, Jun. 21, 2014, 12 pages.
Pang, Chao et al., Non-RCE3: Intra Motion Compensation with 2-D MVs, Joint Collaborative Team on Video Coding (JCT-VC) of ITU-T SG 16 WP 3 and ISO / IEC JTC 1 / SC 29/WG 11 14th Meeting: Vienna, AT, Jul. 25-Aug. 2, 2013, [JCTVC-N0256], JCTVC-N0256 (version 3), ITU-T, Aug. 2, 2013, 15 pages.
Xu, Xiaozhong et al., CE8: CPR reference memory reuse with reduced memory requirement (CE8.1.2b and CE8.1.2c), Joint Video Experts Team (JVET) of ITU-T SG 16 WP 3 and ISO / IEC JTC 1 / SC 29/WG 11 13th Meeting: Marrakesh, MA, Jan. 9-18, 2019, [JVET-M0408-v3], JVET-M0408 (version3), ITU-T, Jan. 17, 2019, 11 pages.
Xu, Xiaozhong et al., Non-CE8: IBC search range increase for small CTU size, Joint Video Experts Team (JVET) of ITU-T SG 16 WP 3 and ISO / IEC JTC 1 / SC 29/WG 11 14th Meeting: Geneva, CH, Mar. 19-27, 2019, [JVET-N0384-v1], JVET-N0384 (version 1), ITU-T, Mar. 13, 2019, 7 pages.
Gao, Han et al., Non-CE8: IBC Reference Memory for Arbitrary CTU Size, Joint Video Experts Team (JVET) of ITU-T SG 16 WP 3 and ISO /IEC JTC 1 / SC 29/WG 11 14th Meeting: Geneva, CH, Mar. 19-27, 2019, [JVET-N0175], JVET-N0175 (version 1), ITU-T, Mar. 13, 2019, 10 pages.
Russian Search Report dated Jan. 18, 2022 in Application No. 2021128489/07(060310) with English Translation.
European Search Report dated Jan. 7, 2022 in Application No. 19861977.7.
Japanese Office Action dated Jan. 7, 2022 in Application No. 2020-563419 with English Translation.
Korean Office Action dated Apr. 8, 2022 in Application No. 10-2020-7028693 with English Translation.
Xiaozhong Xu et al., "Intra Block Copy in HEVC Screen Content Coding Extensions", IEEE Journal On Emerging and Selected Topics in Circuits and Systems, May 2016.
Rajan Joshi et al., "High Efficiency Video Coding (HEVC) Screen Content Coding: Draft 6", ISO/IEC JTC 1/SC 29/WG 11 JCTVC-W1005-v4, Feb. 2016.
Xiaozhong Xu, et al., "CE8: CPR mode with local search ranges (Test CE8.3.1 and CE8.3.2)", ISO/IEC JTC 1/SC 29/WG 11 JVET-L0293 v2, Oct. 2018.
Xiaozhong Xu, et al., "CE8-related: CPR mode with local search range optimization", ISO/IEC JTC 1/SC 29/WG 11 JVET-L0297-v1, Oct. 2018.
Benjamin Brass, et al., "Versatile Video Coding (Draft 3)", ISO/IEC JTC 1/SC 29/WG 11 JVET-L1001-v7, Oct. 2018.
Shan Liu et al., "Overview of HEVC extensions on screen content coding", SIP (2015), vol. 4, e10, p. 1 of 12, Aug. 2015.
Extended European Search Report dated Nov. 17, 2021 in European Application No. 20769471.2.
Supplementary European Search Report dated Dec. 7, 2021 in European Application No. 20769471.2.
Office Action dated Oct. 14, 2021 in Korean Application No. 10-2020-7031460 (w/English translation).
Luong Pham Van et al., "CE8-related: Restrictions for the search area of the Ibc blocks in CPR", Joint Video Experts Team (JVET) of ITU-T SG 16 WP 3 and ISO/IEC JTC 1/SC 29/WG 11, $12^{th}$ Meeting: Macao, CN, Oct. 3-12, 2018.
Xiaozhong Xu et al., "CE8: CPR reference memory reuse without increasing memory requirement (CE8.1.2a and CE8.1.2d)", Joint Video Experts Team (JVET) of ITU-T SG 16 WP 3 and ISO/IEC JTC 1/SC 29/WG 11, $13^{th}$ Meeting: Marrakesh, MA, Jan. 9-18, 2019.
Jizheng Xu et al., "Non-CE8: intra block copy clean-up", Joint Video Experts Team (JVET) of ITU-T SG 16 WP 3 and ISO/IEC JTC 1/SC 29/WG 11, $14^{th}$ Meeting: Geneva, CH, Mar. 19-27, 2019.
Xiaozhong Xu et al., "Non-CE8: IBC search range adjustment for implementation consideration", Joint Video Experts Team (JVET) of ITU-T SG 16 WP 3 and ISO/IEC JTC 1/SC 29/WG 11, $14^{th}$ Meeting: Geneva, CH, Mar. 19-27, 2019.
PoLin Lai et al., "AHG14: Intra Block Copy reference area for Wavefront Parallel Processing (WPP)", Joint Collaborative Team on Video Coding (JCT-VC) of ITU-T SG 16 WP 3 and ISO/IEC JTC 1/SC 29/WG 11, $19^{th}$ Meeting: Strasbourg, FR Oct. 17-24, 2014.
Xiaozhong Xu et al., "Block Vector Prediction in Intra Block Copy for HEVC Screen Content Coding", 2015 Data Compression Conference, Apr. 7-9, 2015.
Xiaozhong Xu et al., "Non-CE2: Intra BC merge mode with default candidates", Joint Collaborative Team on Video Coding (JCT-VC) of ITU-T SG 16 WP 3 and ISO/IEC JTC 1/SC 29/WG 11, $19^{th}$ Meeting: Strasbourg, FR, Oct. 17-24, 2014.
Yu-Chen Sun et al., "Improvements of HEVC SCC Palette Mode and Intra Block Copy", IEEE Journal on Emerging and Selected Topics in Circuits and Systems, vol. 6, No. 4, Dec. 2016.
Xiaozhong Xu et al., "On chroma motion vector derivation for intra block copy", Joint Collaborative Team on Video Coding (JCT-VC) of ITU-T SG 16 WP 3 and ISO/IEC JTC 1/SC 29/WG 11, $21^{st}$ Meeting: Warsaw, PL, Jun. 19-26, 2015.
Xiaozhong Xu et al., "On reference picture list construction for intra block copy", Joint Collaborative Team on Video Coding (JCT-VC) of ITU-T SG 16 WP 3 and ISO/IEC JTC 1/SC 29/WG 11, $21^{st}$ Meeting: Warsaw, PL, Jun. 19-26, 2015.
Xiaozhong Xu et al., "On Storage of filtered and unfiltered current decoded pictures", Joint Collaborative Team on Video Coding (JCT-VC) of ITU-T SG 16 WP 3 and ISO/IEC JTC 1/SC 29/WG 11, $21^{st}$ Meeting: Warsaw, PL, Jun. 19-26, 2015.
Xiaozhong Xu et al., "On intra block copy signalling and constraints", Joint Collaborative Team on Video Coding (JCT-VC) of ITU-T SG 16 WP 3 and ISO/IEC JTC 1/SC 29/WG 11, $22^{nd}$ Meeting: Geneva, CH, Oct. 15-21, 2015.
Xiaozhong Xu et al., "DPB considerations when current picture is a reference picture", Joint Collaborative Team on Video Coding

(56) References Cited

OTHER PUBLICATIONS (JCT-VC) of ITU-T SG 16 WP 3 and ISO/IEC JTC 1/SC 29/WG 11, 21st Meeting: Warsaw, PL, Jun. 19-26, 2015.
Xiaozhong Xu et al., "Bug fix for DPB operations when current picture is a reference picture", Joint Collaborative Team on Video Coding (JCT-VC) of ITU-T SG 16 WP 3 and ISO/IEC JTC 1/SC 29/WG 11 , 23rd Meeting: San Diego, USA Feb. 19-26, 2016.
Chun-Chi Chen et al., "Intra Line Copy for HEVC Screen Content Coding", Feb. 16, 2015.
Jianle Chen et al., "Algorithm Description of Joint Exploration Test Model 7 (JEM 7)", Joint Video Experts Team (JVET) of ITU-T SG 16 WP 3 and ISO/IEC JTC 1/SC 29/WG 11, 7th Meeting: Torino, IT, 1Jul. 13-21, 2017.
Steffen Kamp et al., "Decoder-Side Motion Vector Derivation for Block-Based Video Coding", IEEE Transactions on Circuits and Systems for Video Technology, vol. 22, No. 12, Dec. 2012.
Shen Songwei et al., "Deformable Motion Model for Frame Rate Up-Conversion in Video Coding", Feb. 9, 2017.
Rajan Joshi et al., "Screen content coding test model 5 (SCM 5)", Joint Collaborative Team on Video Coding (JCT-VC) of ITU-T SG 16 WP 3 and ISO/IEC JTC 1/SC 29/WG 11, 21st Meeting: Warsaw, PL, Jun. 19-26, 2015.
Xiaozhong Xu et al., "Description of Core Experiment 8: Current Picture Referencing", Joint Video Experts Team (JVET) of ITU-T SG 16 WP 3 and ISO/IEC JTC 1/SC 29/WG 11, 11th Meeting: Ljubljana, SI, Jul. 10-18, 2018.
Rajan Joshi et al., "High Efficiency Video Coding (HEVC) Screen Content Coding: Draft 3", Joint Collaborative Team on Video Coding (JCT-VC) of ITU-T SG 16 WP 3 and ISO/IEC JCT 1/SC 29/WG 11, 20th Meeting: Geneva, CH,Feb. 10-Feb. 17, 2015.
International Telecommunication Union, "High efficiency video coding", Series H: Audiovisual and Multimedia Systems, Infrastructure of audiovisual services—Coding of moving video, Recommendation ITU-T H.265, ITU-T Telecommunication Standardization Sector of ITU, H.265 Dec. 2016.

\* cited by examiner

FIG. 12D

METHOD AND APPARATUS FOR VIDEO CODING

CROSS-REFERENCE TO RELATED APPLICATIONS

This application is a continuation of and claims the benefit of priority under 35 U.S.C. § 120 from U.S. application Ser. No. 16/528,148 filed Jul. 31, 2019, which claims the benefit of priority from U.S. Provisional Application No. 62/816,125 filed Mar. 9, 2019 and 62/735,002 filed Sep. 21, 2018, the entire contents of each of which are incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide methods and apparatuses for video encoding/decoding. In some examples, an apparatus for video decoding includes processing circuitry. The processing circuitry decodes prediction information of a current block from a coded video bitstream where the prediction information is indicative of an intra block copy mode and the current block is one of a plurality of coding blocks in a current region of a current coding tree block (CTB) in a current picture. The processing circuitry determines whether the current block is to be reconstructed first in the current region. When the current block is to be reconstructed first in the current region, the processing circuitry determines a block vector for the current block. A reference block indicated by the block vector is in a search range that excludes a collocated region in a previously reconstructed CTB and a position of the collocated region in the previously reconstructed CTB has a same relative position as the current region in the current CTB. The search range is in the current picture. The processing circuitry reconstructs at least one sample of the current block according the block vector. The search range can include coding blocks that are reconstructed after the collocated region and before the current block.

In an embodiment, a size of the current CTB is equal to a reference memory size, the previously reconstructed CTB is a left neighbor of the current CTB, the position of the collocated region is offset by a width of the current CTB from a position of the current region, and the coding blocks in the search range are in at least one of: the current CTB and the previously reconstructed CTB.

In an example, the size of the current CTB and the previously reconstructed CTB is 128 by 128 samples, the current CTB includes 4 regions of 64 by 64 samples, the previously reconstructed CTB includes 4 regions of 64 by 64 samples, the position of the collocated region is offset by 128 samples from the position of the current region, the current region being one of the 4 regions in the current CTB and the collocated region being one of the 4 regions in the previously reconstructed CTB. The 4 regions in the current CTB can include a top left region, a top right region, a bottom left region, and a bottom right region. The 4 regions in the previously reconstructed CTB can include a top left region, a top right region, a bottom left region, and a bottom right region. When the current region is the top left region of the current CTB, the collocated region is the top left region of the previously reconstructed CTB and the search region excludes the top left region of the previously reconstructed CTB. When the current region is the top right region of the current CTB, the collocated region is the top right region of the previously reconstructed CTB and the search region excludes the top left region and the top right region of the previously reconstructed CTB. When the current region is the bottom left region of the current CTB, the collocated region is the bottom left region of the previously reconstructed CTB and the search region excludes the top left region, the top right region, and the bottom left region of the previously reconstructed CTB. When the current region is the bottom right region of the current CTB, the collocated region is the bottom right region of the previously reconstructed CTB and the search region excludes the previously reconstructed CTB.

In an example, the current CTB includes 4 regions having a same size and shape, the previously reconstructed CTB includes 4 regions having the same size and the shape, the current region is one of the 4 regions in the current CTB, and the collocated region is one of the 4 regions in the previously reconstructed CTB.

In an embodiment, a size of the current CTB is less than a reference memory size, the position of the collocated region is offset by multiple widths of the current CTB from a position of the current region, and the coding blocks in the search range are in at least one of: the current CTB, the previously reconstructed CTB, and one or more reconstructed CTBs between the current CTB and the previously reconstructed CTB. In an example, the size of the current CTB is 64×64 samples, the reference memory size is 128× 128 samples, the current CTB includes 4 regions of 32×32 samples, the previously reconstructed CTB includes 4 regions of 32×32 samples, the position of the collocated region is offset by 256 samples from the position of the current region. In an example, the coding blocks in the search range are in at least one of: the current CTB and the one or more reconstructed CTBs between the current CTB and the previously reconstructed CTB. In an example, the search range excludes the previously reconstructed CTB that is offset by N widths of the current CTB from the current CTB where N is a ratio of the reference memory size over the size of the current CTB.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 12A-12D show examples of intra block copy according to an embodiment of the disclosure.

DETAILED DESCRIPTION OF EMBODIMENTS

Figure 1:
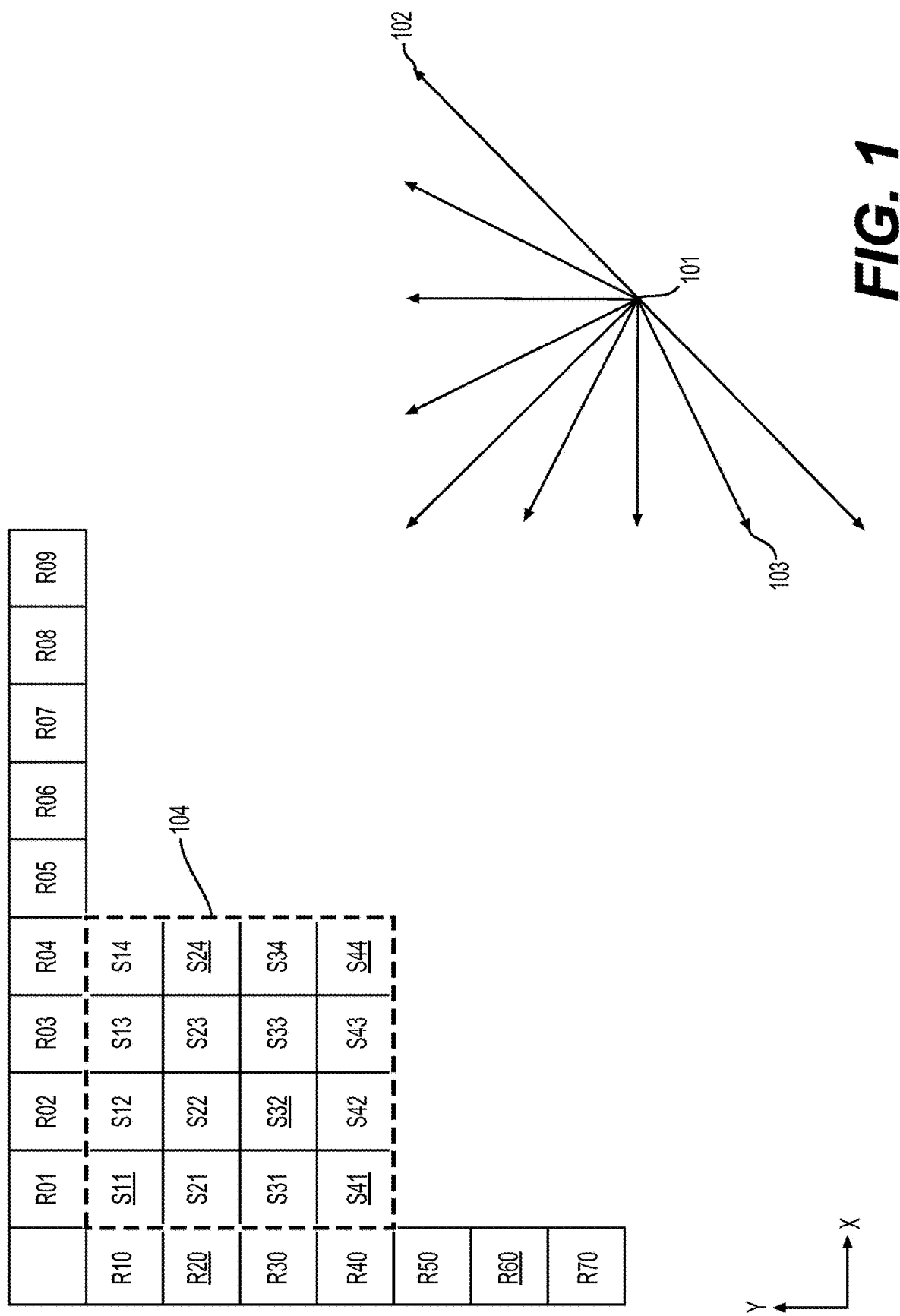
FIG. 1 is a schematic illustration of an exemplary subset of intra prediction modes.
Figure 2:
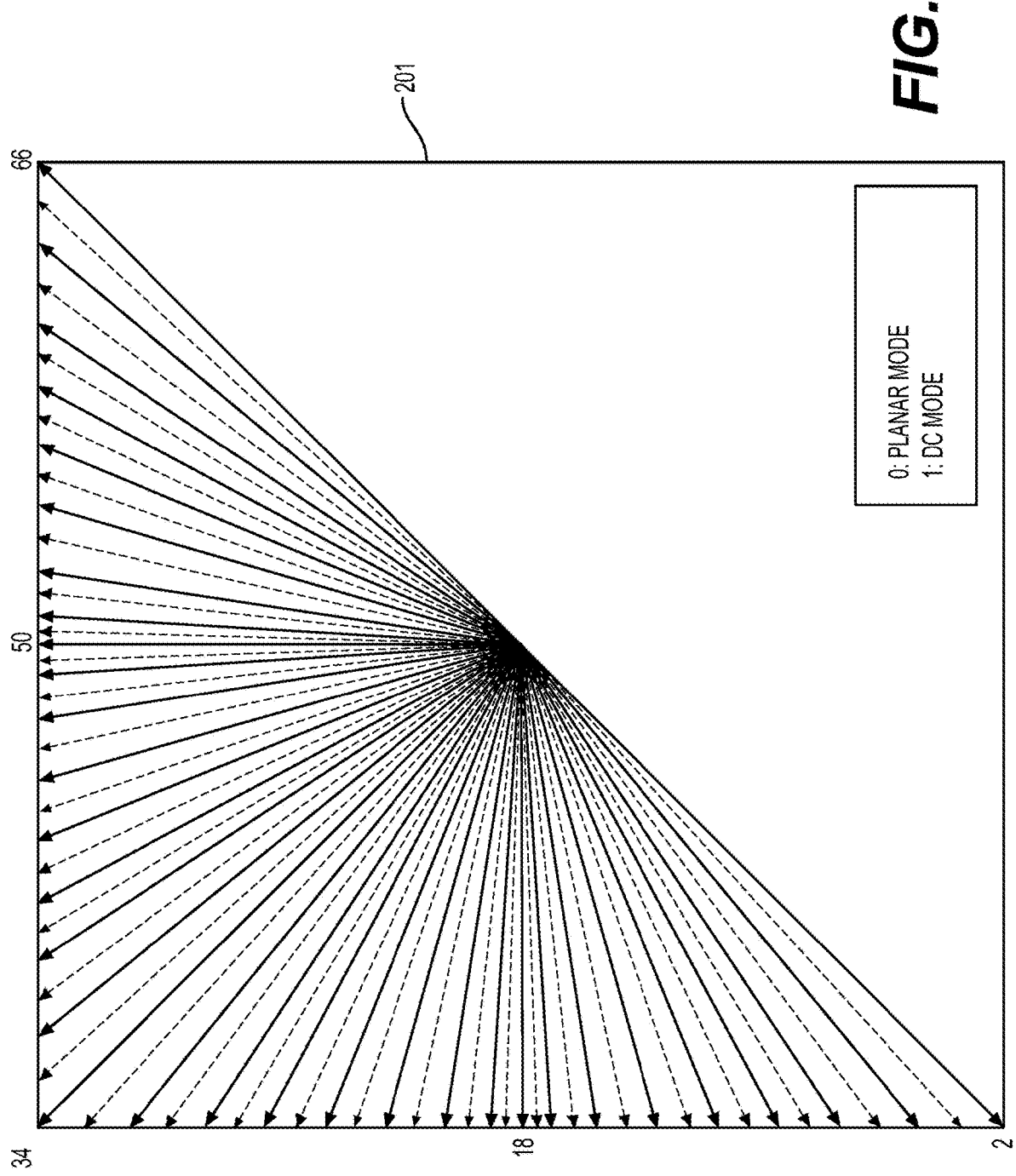
FIG. 2 is an illustration of exemplary intra prediction directions.
Figure 3:
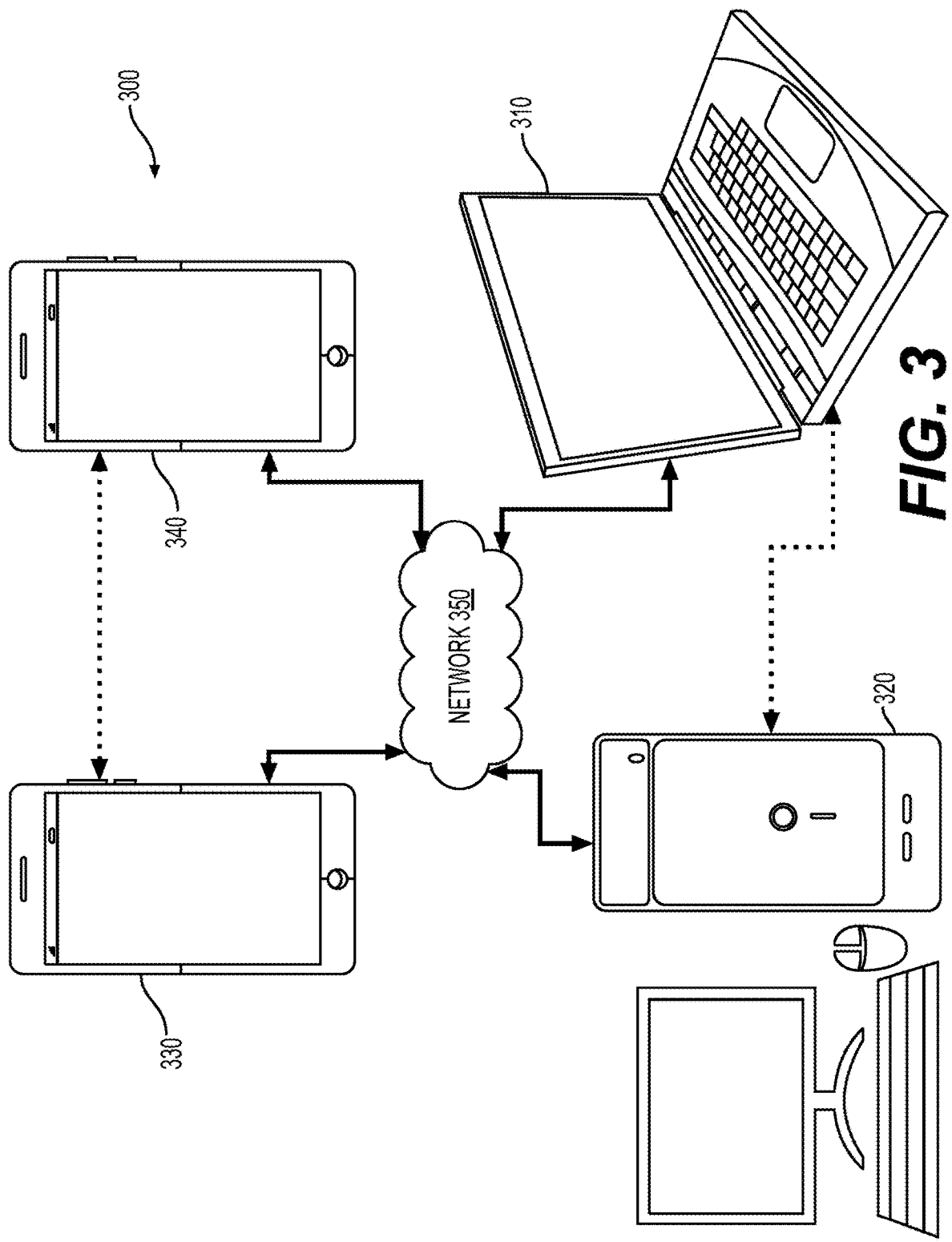
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
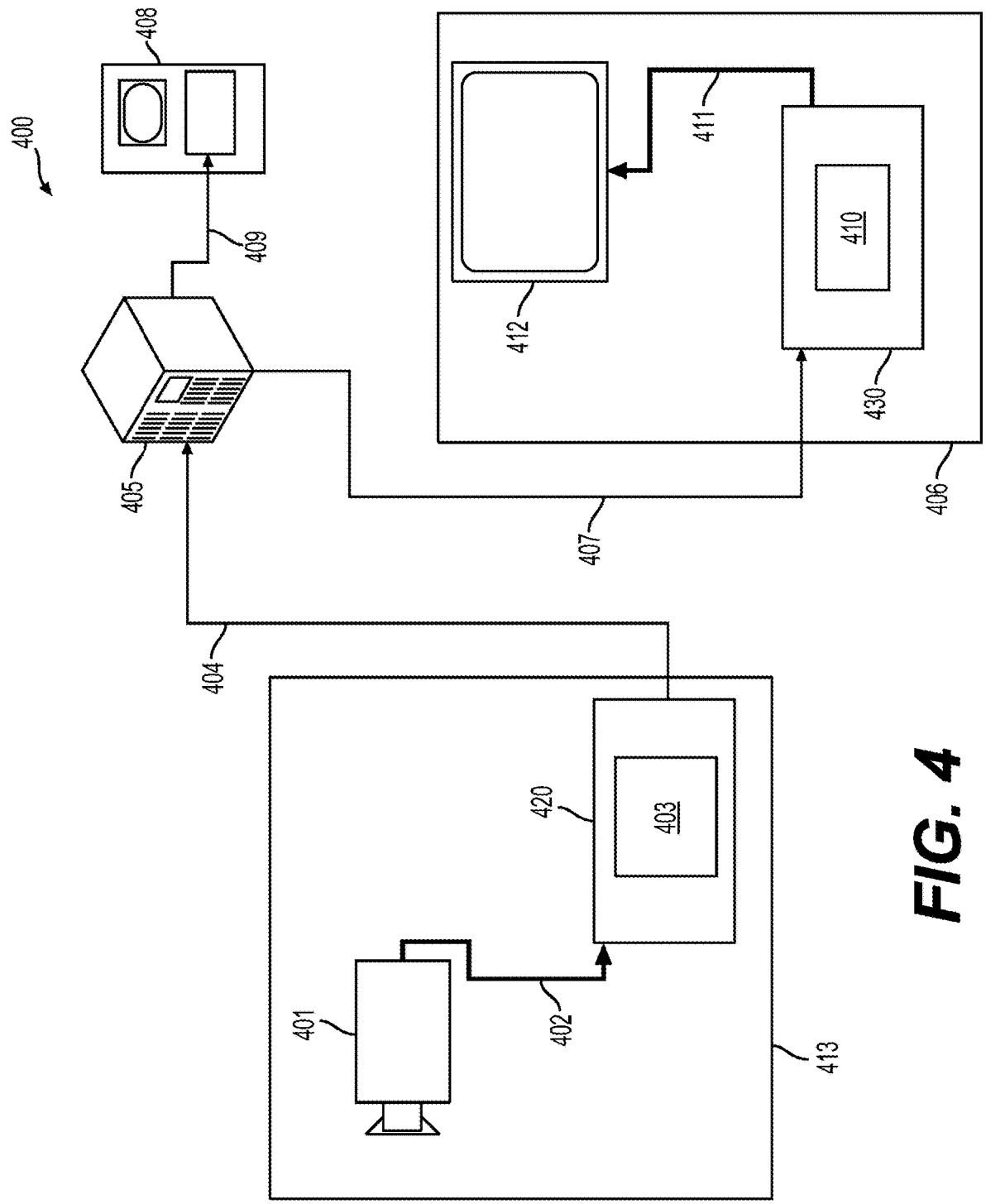
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
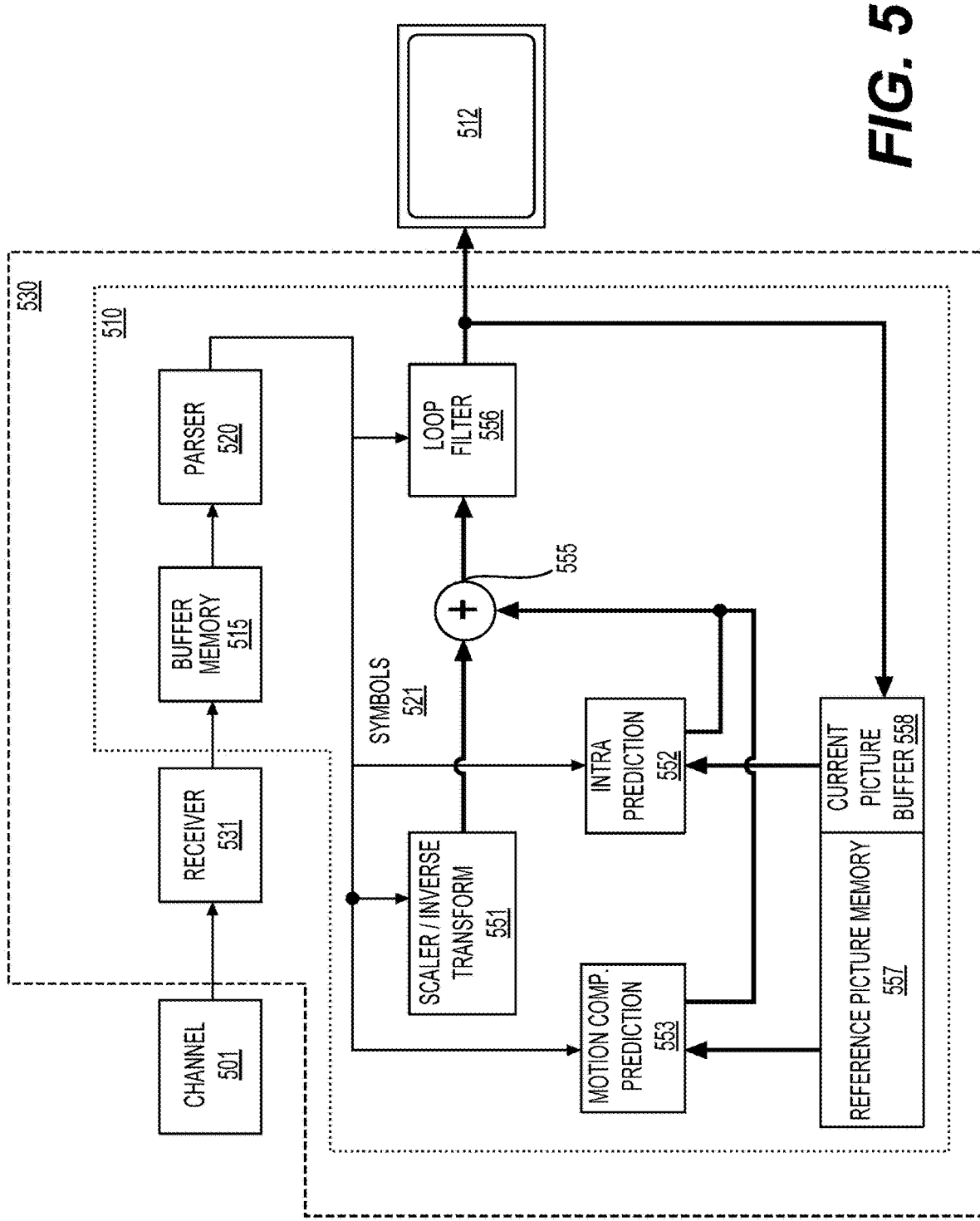
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
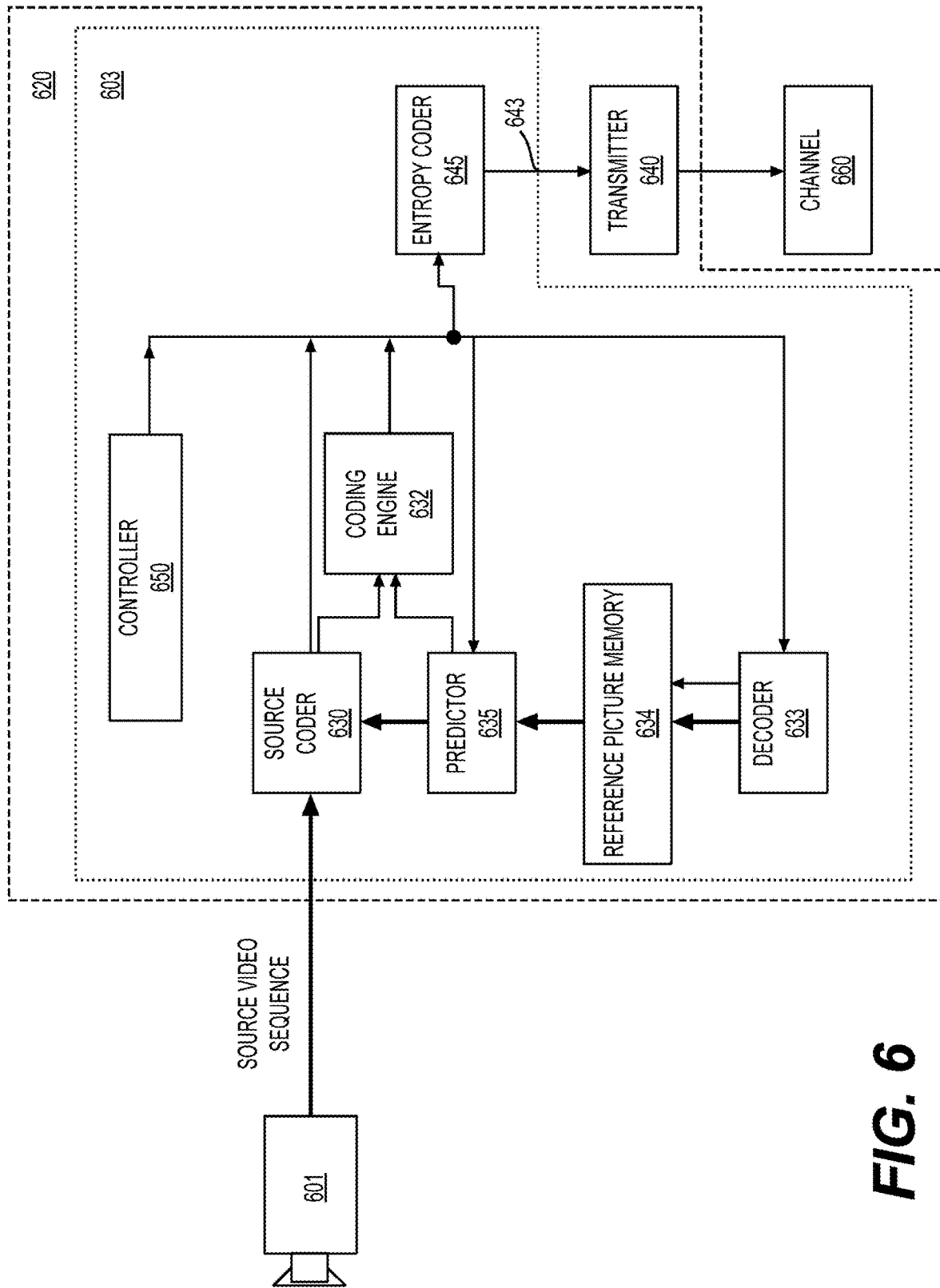
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
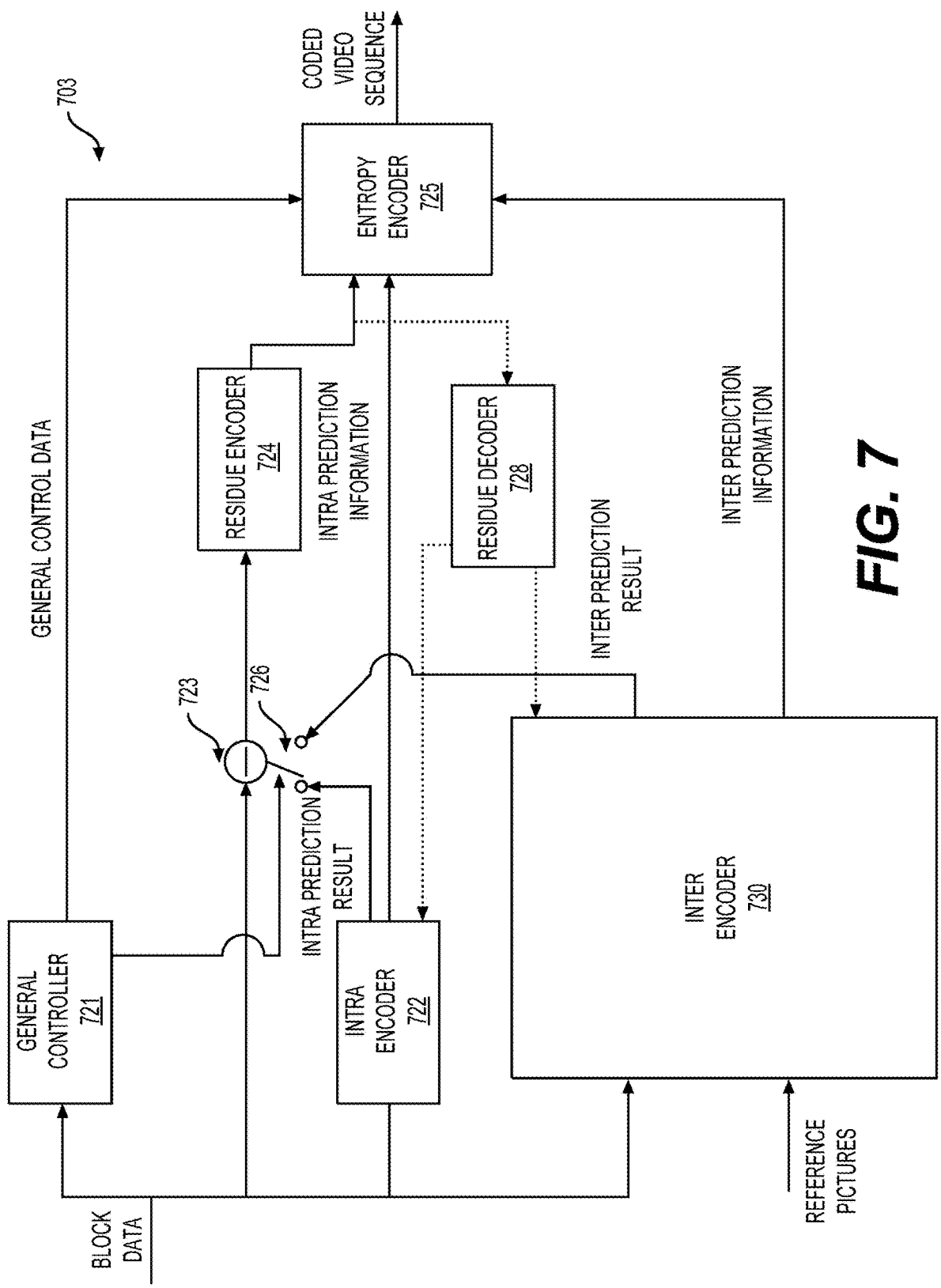
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
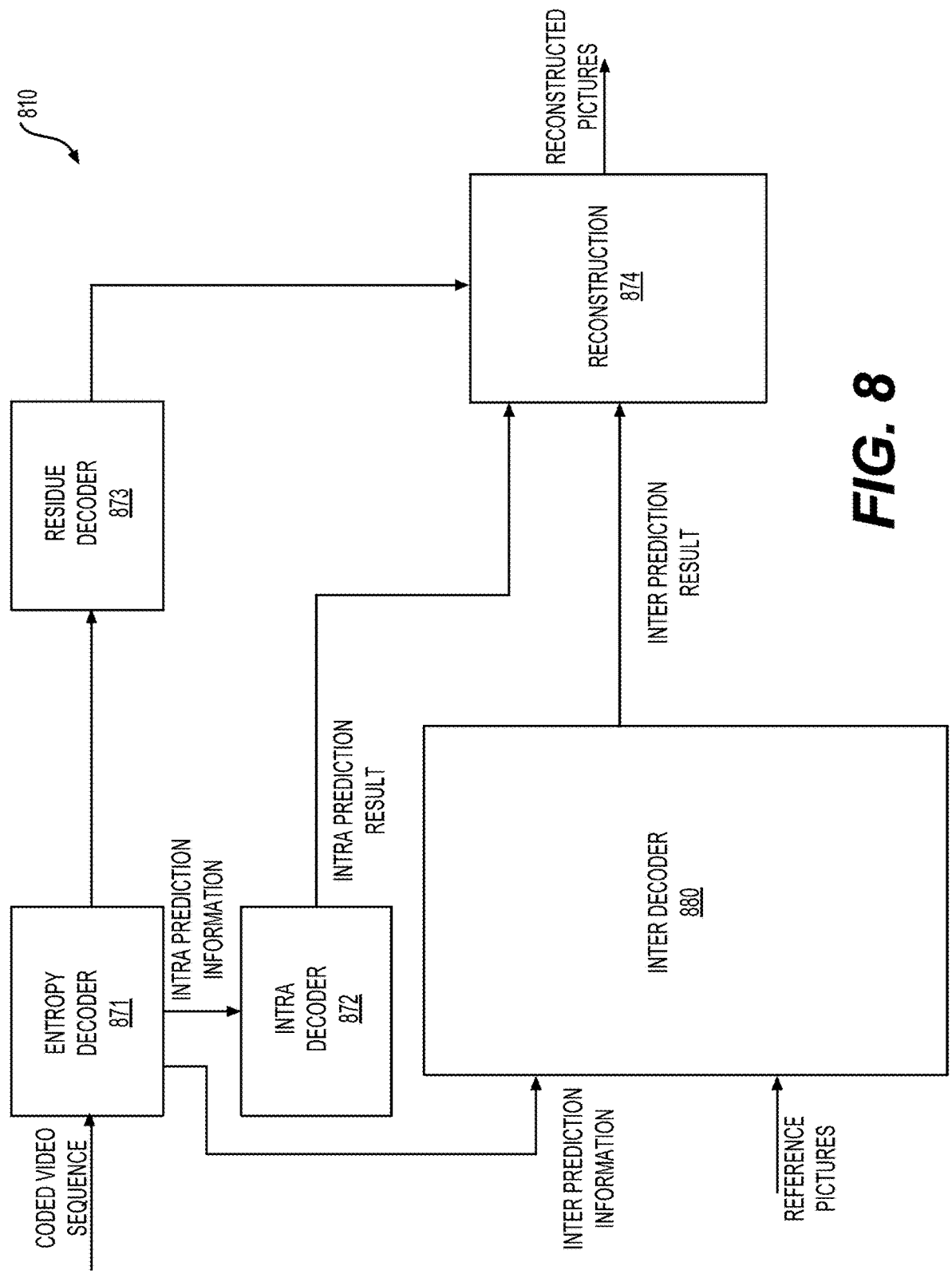
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide techniques for search range adjustment for intra picture block compensation.

Block based compensation can be used for inter prediction and intra prediction. For the inter prediction, block based compensation from a different picture is known as motion compensation. Block based compensation can also be done from a previously reconstructed area within the same picture, such as in intra prediction. The block based compensation from reconstructed area within the same picture is referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can be at any value (positive or negative, at either x or y direction), a BV has a few constraints to ensure that the reference block is available and already reconstructed. Also, in some examples, for parallel processing consideration, some reference area that is tile boundary, slice boundary, or wavefront ladder shape boundary is excluded.

The coding of a block vector could be either explicit or implicit. In the explicit mode, a BV difference between a block vector and its predictor is signaled. In the implicit mode, the block vector is recovered from a predictor (referred to as block vector predictor) without using the BV difference, in a similar way as a motion vector in merge mode. The resolution of a block vector, in some implementations, is restricted to integer positions. In other systems, the block vector is allowed to point to fractional positions.

In some examples, the use of intra block copy at a block level can be signaled using a block level flag, such as an IBC flag. In an embodiment, the block level flag is signaled when the current block is coded explicitly. In some examples, the use of intra block copy at a block level can be signaled using a reference index approach. The current picture under decoding is then treated as a reference picture or a special reference picture. In an example, such a reference picture is put in the last position of a list of reference pictures. The special reference picture is also managed together with other temporal reference pictures in a buffer, such as a decoded picture buffer (DPB).

There are also some variations for intra block copy, such as flipped intra block copy (the reference block is flipped horizontally or vertically before used to predict a current block), or line based intra block copy (each compensation unit inside an M×N coding block is an M×1 or 1×N line).

As described above, a BV of a current block under reconstruction in a picture can have certain constraints, and thus, a reference block for the current block is within a search range. The search range refers to a part of the picture from which the reference block can be selected. For example, the search range may be within certain portions of a reconstructed area in the picture. A size, a position, a shape, and/or the like of the search range can be constrained. Alternatively, the BV can be constrained. In an example, the BV is a two-dimensional vector including an x and a y component, and at least one of the x and y components can be constrained. Constraints can be specified with respect to the BV, the search range, or a combination of the BV and the search range. In various examples, when certain constraints are specified with respect to the BV, the search range is constrained accordingly. Similarly, when certain constraints are specified with respect to the search range, the BV is constrained accordingly.

Figure 9:
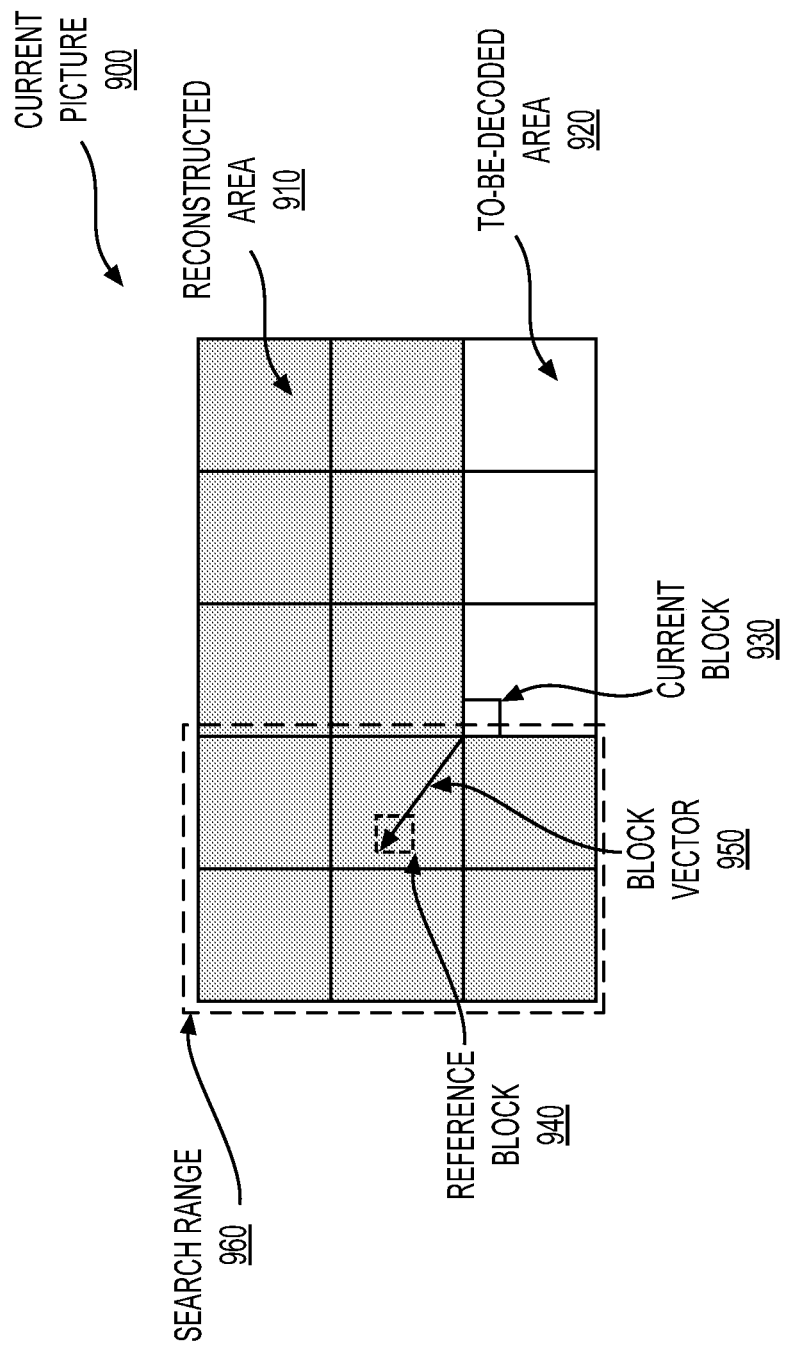
FIG. 9 shows an example of intra block copy according to an embodiment of the disclosure.

FIG. 9 shows an example of intra block copy according to an embodiment of the disclosure. A current picture (900) is to be reconstructed under decoding. The current picture (900) includes a reconstructed area (910) (grey area) and a to-be-decoded area (920) (white area). A current block (930) is under reconstruction by a decoder. The current block (930) can be reconstructed from a reference block (940) that is in the reconstructed area (910). A position offset between the reference block (940) and the current block (930) is referred to as a block vector (950) (or BV (950)). In the FIG. 9 example, a search range (960) is within the reconstructed area (910), the reference block (940) is within the search range (960), and the block vector (950) is constrained to point to the reference block (940) within the search range (960).

Various constraints can be applied to a BV and/or a search range. In an embodiment, a search range for a current block under reconstruction in a current CTB is constrained to be within the current CTB.

In an embodiment, an effective memory requirement to store reference samples to be used in intra block copy is one CTB size. In an example, the CTB size is 128×128 samples. A current CTB includes a current region under reconstruction. The current region has a size of 64×64 samples. Since a reference memory can also store reconstructed samples in the current region, the reference memory can store 3 more regions of 64×64 samples when a reference memory size is equal to the CTB size of 128×128 samples. Accordingly, a search range can include certain parts of a previously reconstructed CTB while a total memory requirement for storing reference samples is unchanged (such as 1 CTB size of 128×128 samples or 4 64×64 reference samples in total). In an example, the previously reconstructed CTB is a left neighbor of the current CTB, such as shown in FIG. 10.

Figure 10:
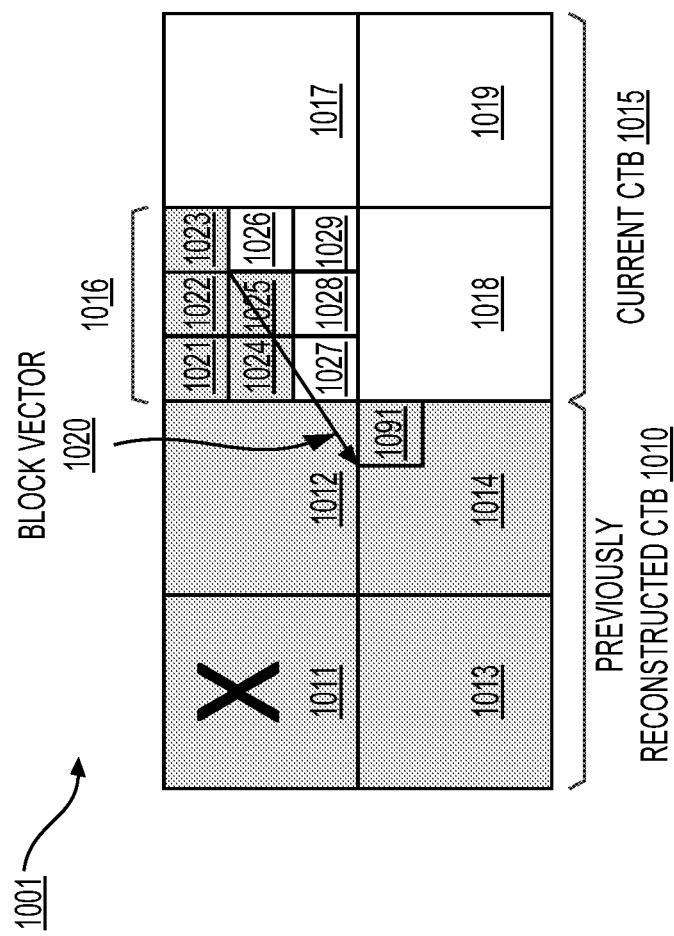
FIG. 10 shows an example of intra block copy according to an embodiment of the disclosure.

FIG. 10 shows an example of intra block copy according to an embodiment of the disclosure. A current picture (1001) includes a current CTB (1015) under reconstruction and a previously reconstructed CTB (1010) that is a left neighbor of the current CTB (1015). CTBs in the current picture (1001) have a CTB size, such as 128×128 samples, and a CTB width, such as 128 samples. The current CTB (1015) includes 4 regions (1016)-(1019), where the current region (1016) is under reconstruction. The current region (1016) includes a plurality of coding blocks (1021)-(1029). Similarly, the previously reconstructed CTB (1010) includes 4 regions (1011)-(1014). The coding blocks (1021)-(1025) are reconstructed, the current block (1026) is under reconstruction, and the coding blocks (1026)-(1027) and the regions (1017)-(1019) are to be reconstructed.

The current region (1016) has a collocated region (i.e., the region (1011), in the previously reconstructed CTB (1010)). A relative position of the collocated region (1011) with respect to the previously reconstructed CTB (1010) can be identical to a relative position of the current region (1016) with respect to the current CTB (1015). In the example illustrated in FIG. 10, the current region (1016) is a top left region in the current CTB (1015), and thus, the collocated region (1011) is also a top left region in the previously reconstructed CTB (1010). Since a position of the previously reconstructed CTB (1010) is offset from a position of the current CTB (1015) by the CTB width, a position of the collocated region (1011) is offset from a position of the current region (1016) by the CTB width.

In an embodiment, a collocated region of the current region (1016) is in a previously reconstructed CTB where a position of the previously reconstructed CTB is offset by one or multiples of the CTB width from the positon of the current CTB (1015), and thus, a position of the collocated region is also offset by a corresponding one or multiples of the CTB width from the position of the current region (1016). The position of the collocated region can be left shifted, up shifted, or the like from the current region (1016).

As described above, a size of a search range for the current block (1026) is constrained by the CTB size. In the FIG. 10 example, the search range can include the regions (1012)-(1014) in the previously reconstructed CTB (1010) and a portion of the current region (1016) that is already reconstructed, such as the coding blocks (1021)-(1025). The search range further excludes the collocated region (1011) so that the size of the search range is within the CTB size. Referring to FIG. 10, a reference block (1091) is located in the region (1014) of the previously reconstructed CTB (1010). A block vector (1020) indicates an offset between the current block (1026) and the respective reference block (1091). The reference block (1091) is in the search range.

The example illustrated in FIG. 10 can be suitably adapted to other scenarios where a current region is located at another location in the current CTB (1015). In an example, when a current block is in the region (1017), a collocated region for the current block is the region (1012). Therefore, a search range can include the regions (1013)-(1014), the region (1016), and a portion of the region (1017) that is already reconstructed. The search range further excludes the region (1011) and the collocated region (1012) so that the size of the search range is within the CTB size. In an example, when a current block is in the region (1018), a collocated region for the current block is the region (1013). Therefore, a search range can include the region (1014), the regions (1016)-(1017), and a portion of the region (1018) that is already reconstructed. The search range further excludes the regions (1011)-(1012) and the collocated region (1013) so that the size of the search range is within the CTB size. In an example, when a current block is in the region (1019), a collocated region for the current block is the region (1014). Therefore, a search range can include the regions (1016)-(1018), and a portion of the region (1019) that is already reconstructed. The search range further excludes the previously reconstructed CTB (1010) so that the size of the search range is within the CTB size.

In the above description, a reference block can be in the previously reconstructed CTB (1010) or the current CTB (1015).

In an embodiment, a search range can be specified as below. In an example, a current picture is a luma picture and a current CTB is a luma CTB including a plurality of luma samples and a block vector mvL satisfies the following constraints for bitstream conformance.

The constraints include first conditions that a reference block for the current block is already reconstructed. When the reference block has a rectangular shape, a reference block availability checking process can be implemented to check whether a top left sample and a bottom right sample of the reference block are reconstructed. When both the top left sample and the bottom right sample of the reference block are reconstructed, the reference block is determined to be reconstructed.

For example, when a derivation process for reference block availability is invoked with a position (xCurr, yCurr) of a top left sample of the current block set to be (xCb, yCb) and a position (xCb+(mvL[0]>>4), yCb+(mvL[1]>>4)) of the top left sample of the reference block as inputs, an output is equal to TRUE when the top left sample of the reference block is reconstructed where the block vector mvL is a two-dimensional vector having a x component mvL[0] and a y component mvL[1].

Similarly, when a derivation process for block availability is invoked with the position (xCurr, yCurr) of the top left sample of the current block set to be (xCb, yCb) and a position (xCb+(mvL[0]>>4)+cbWidth−1, yCb+(mvL[1]>>4)+cbHeight−1) of the bottom right sample of the reference block as inputs, an output is equal to TRUE when the bottom right sample of the reference block is reconstructed. The parameters cbWidth and cbHeight represent a width and a height of the reference block.

The constraints can also include at least one of the following second conditions: 1) a value of (mvL[0]>>4)+cbWidth is less than or equal to 0, which indicates that the reference block is to the left of the current block and does not overlap with the current block; 2) a value of (mvL[1]>>4)+cbHeight is less than or equal to 0, which indicates that the reference block is above the current block and does not overlap with the current block.

The constraints can also include that the following third conditions are satisfied by the block vector mvL:

$$(yCb+(mvL[1]>>4))>>Ctb\ \text{Log 2SizeY}=yCb>>Ctb\ \text{Log 2SizeY} \quad (1)$$

$$(yCb+(mvL[1]>>4+cbHeight-1)>>Ctb\ \text{Log 2SizeY}=yCb>>Ctb\ \text{Log 2Size} \quad (2)$$

$$(xCb+(mvL[0]>>4))>>Ctb\ \text{Log 2SizeY}>=(xCb>>Ctb\ \text{Log 2SizeY})-1 \quad (3)$$

$$(xCb+(mvL[0]>>4)+cbWidth-1)>>Ctb\ \text{Log 2SizeY}<=(xCb>>Ctb\ \text{Log 2SizeY}) \quad (4)$$

where the parameters Ctb Log 2SizeY represents the CTB width in Log 2 form. For example, when the CTB width is 128 samples, Ctb Log 2 SizeY is 7. Eqs. (1)-(2) specify that a CTB including the reference block is in a same CTB row as the current CTB (i.e., the previously reconstructed CTB (1010) is in a same row as the current CTB (1015) when the reference block is in the previously reconstructed CTB (1010)). Eqs. (3)-(4) specify that the CTB including the reference block is either in a left CTB column of the current CTB or a same CTB column as the current CTB. The third conditions as described by Eqs. (1)-(4) specify that the CTB including the reference block is either the current CTB, such as the current CTB (1015), or a left neighbor, such as the previously reconstructed CTB (1010), of the current CTB, similarly to the description with reference to FIG. 10.

The constraints can further include fourth conditions: when the reference block is in the left neighbor of the current CTB, a collocated region for the reference block is not reconstructed (i.e., no samples in the collocated region have been reconstructed). Further, the collocated region for the reference block is in the current CTB. In the FIG. 10 example, a collocated region for the reference block (1091) is the region (1019) that is offset by the CTB width from the region (1014) where the reference block (1091) is located and the region (1019) has not been reconstructed. Therefore, the block vector (1020) and the reference block (1091) satisfy the fourth conditions described above.

In an example, the fourth conditions can be specified as below: when (xCb+(mvL[0]>>4))>>Ctb Log 2SizeY is equal to (xCb>>Ctb Log 2SizeY)−1, the derivation process for reference block availability is invoked with the position of the current block (xCurr, yCurr) set to be (xCb, yCb) and a position (((xCb+(mvL[0]>>4)+CtbSizeY)>>(Ctb Log 2SizeY−1))<<(Ctb Log 2SizeY−1), ((yCb+(mvL[1]>>4))>>(Ctb Log 2SizeY−1))<<(Ctb Log 2SizeY−1)) as inputs, an output is equal to FALSE indicating that the collocated region is not reconstructed, such as shown in FIG. 10.

The constraints for the search range and/or the block vector can include a suitable combination of the first, second, third, and fourth conditions described above. In an example, the constraints include the first, second, third, and fourth conditions, such as shown in FIG. 10. In an example, the first, second, third, and/or fourth conditions can be modified and the constraints include the modified first, second, third, and/or fourth conditions.

According to the fourth conditions, when one of the coding blocks (1022)-(1029) is a current block, a reference block cannot be in the region (1011), and thus, a search range for the one of the coding blocks (1022)-(1029) excludes the region (1011). The reasons why the region (1011) is excluded are specified below: if the reference block is in the region (1011), then a collocated region for the reference block is the region (1016), however, at least samples in the coding block (1021) have been reconstructed, and thus, the fourth conditions are violated. On the other hand, for a coding block to be reconstructed first in a current region, such as a coding block (1121) in a region (1116) in FIG. 11, the fourth conditions does not prevent a reference block to be in the region (1111) because a collocated region (1116) for the reference block has not been reconstructed yet.

Figure 11:
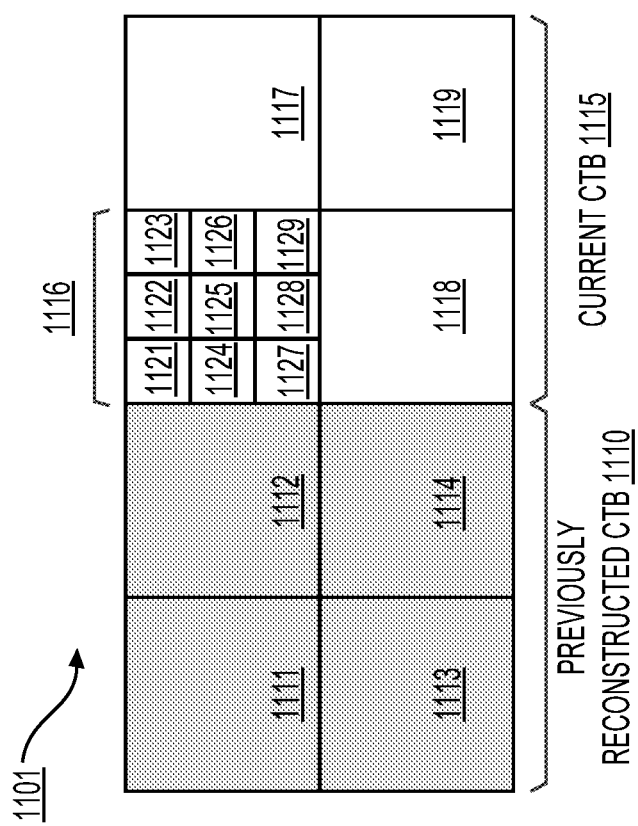
FIG. 11 shows an example of intra block copy according to an embodiment of the disclosure.

FIG. 11 shows an example of intra block copy according to an embodiment of the disclosure. A current picture (1101) includes a current CTB (1115) under reconstruction and a previously reconstructed CTB (1110) that is a left neighbor of the current CTB (1115). CTBs in the current picture (1101) have a CTB size and a CTB width. The current CTB (1115) includes 4 regions (1116)-(1119) where the current region (1116) is under reconstruction. The current region (1116) includes a plurality of coding blocks (1121)-(1129). Similarly, the previously reconstructed CTB (1110) includes 4 regions (1111)-(1114). The current block (1121) under reconstruction is to be reconstructed first in the current region (1116) and the coding blocks (1122)-(1129) are to be reconstructed. In an example, the CTB size is 128×128 samples, each of the regions (1111)-(1114) and (1116)-(1119) is 64×64 samples. A reference memory size is equal to the CTB size and is 128×128 samples, and thus, the search range, when bounded by the reference memory size, includes 3 regions and a portion of an additional region.

Similarly as described with reference to FIG. 10, the current region (1116) has a collocated region (i.e., the region (1111) in the previously reconstructed CTB (1110)). According to the fourth conditions described above, a reference block for the current block (1121) can be in the region (1111), and thus, a search range can include the regions (1111)-(1114). For example, when the reference block is in the region (1111), a collocated region of the reference block is the region (1116), where no samples in the region (1116) have been reconstructed prior to the reconstruction of the current block (1121). However, as described with reference to FIG. 10 and the fourth conditions, for example, after the reconstruction of the coding block (1121), the region (1111) is no longer available to be included in a search range for reconstructing the coding block (1122). Therefore, a tight synchronization and timing control of the reference memory buffer is to be used and can be challenging.

According to some embodiments, when a current block is to be reconstructed first in a current region of a current CTB, a search range can exclude a collocated region of the current region that is in a previously reconstructed CTB where the current CTB and the previously reconstructed CTB are in a same current picture. A block vector can be determined such that a reference block is in the search range that excludes the collocated region in the previously reconstructed CTB. In an embodiment, the search range includes coding blocks that are reconstructed after the collocated region and before the current block in a decoding order.

In the descriptions below, a CTB size can vary and a maximum CTB size is set to be identical to a reference memory size. In an example, the reference memory size or the maximum CTB size is 128×128 samples. The descriptions can be suitably adapted to other reference memory sizes or maximum CTB sizes.

In an embodiment, the CTB size is equal to the reference memory size. The previously reconstructed CTB is a left neighbor of the current CTB, a position of the collocated region is offset by a CTB width from a position of the current region, and the coding blocks in the search range are in at least one of: the current CTB and the previously reconstructed CTB.

FIGS. 12A-12D show examples of intra block copy according to an embodiment of the disclosure. Referring to FIGS. 12A-D, a current picture (1201) includes a current CTB (1215) under reconstruction and a previously reconstructed CTB (1210) that is a left neighbor of the current CTB (1215). CTBs in the current picture (1201) have a CTB size and a CTB width. The current CTB (1215) includes 4 regions (1216)-(1219). Similarly, the previously reconstructed CTB (1210) includes 4 regions (1211)-(1214). In an embodiment, the CTB size is a maximum CTB size and is equal to a reference memory size. In an example, the CTB size and the reference memory size are 128 by 128 samples, and thus, each of the regions (1211)-(1214) and (1216)-(1219) has a size of 64 by 64 samples.

In the examples illustrated in FIGS. 12A-D, the current CTB (1215) includes a top left region, a top right region, a bottom left region, and a bottom right region that correspond to the regions (1216)-(1219), respectively. The previously reconstructed CTB (1210) includes a top left region, a top right region, a bottom left region, and a bottom right region that correspond to the regions (1211)-(1214), respectively.

Figure 12A:
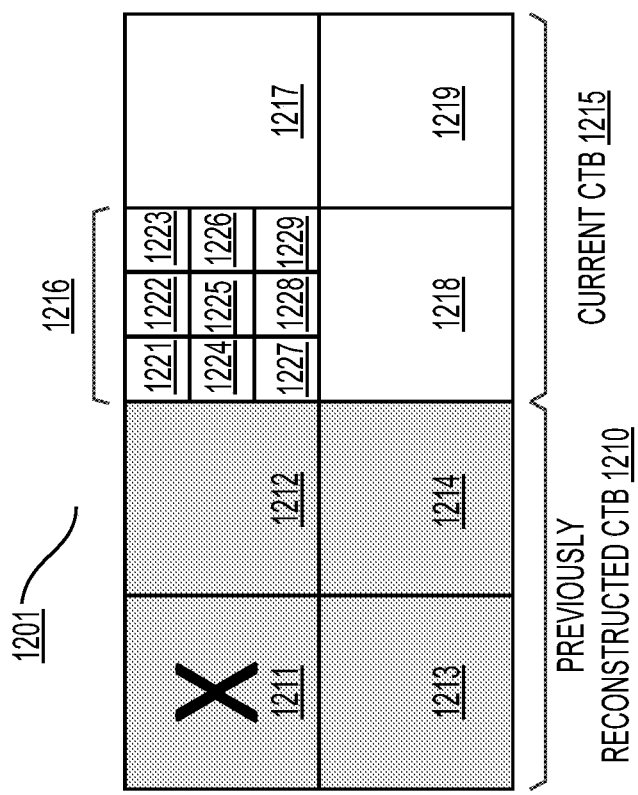

Referring to FIG. 12A, the current region (1216) is under reconstruction. The current region (1216) includes a plurality of coding blocks (1221)-(1229). The current block (1221) is to be reconstructed first in the current region (1216). The current region (1216) has a collocated region, i.e., the region (1211), in the previously reconstructed CTB (1210). According to some embodiments, a search range for the current block (1221) excludes the collocated region (1211) where the current block (1221) is to be reconstructed first in the current region (1216). Therefore, a tight synchronization and timing control of a reference memory buffer is not necessary. Otherwise, when the current block (1221) is to be reconstructed first in the current region (1216) and the search range for the current block (1221) includes the collocated region (1211) and the regions (1212)-(1214), samples of the collocated region (1211) can be used to predict the current block (1221). For example, the samples can be from a collocated block of the current block (1221) in the previously reconstructed CTB (1210), then a processing order in the reference memory buffer can include: reading (or obtaining) a sample from a position x in the reference memory buffer, performing prediction for a sample in the current block (1221) by using the sample from the position x, adding a residue to the prediction, and then writing back the reconstructed sample to the position x in the reference memory buffer. The writing and reading processes to the same reference memory location x can require a tight synchronization, which may not be preferred in some examples. The search range includes the regions (1212)-(1214) of the previously reconstructed CTB (1210) that are reconstructed after the collocated region (1211) and before the current block (1221) in a decoding order.

Referring to FIG. 12A, a position of the collocated region (1211) is offset by the CTB width, such as 128 samples, from a position of the current region (1216). For example, the position of the collocated region (1211) is left shifted by 128 samples from the position of the current region (1216).

Referring again to FIG. 12A, when the current region (1216) is the top left region of the current CTB (1215), the collocated region (1211) is the top left region of the previously reconstructed CTB (1210), and the search region excludes the top left region of the previously reconstructed CTB.

Figure 12B:
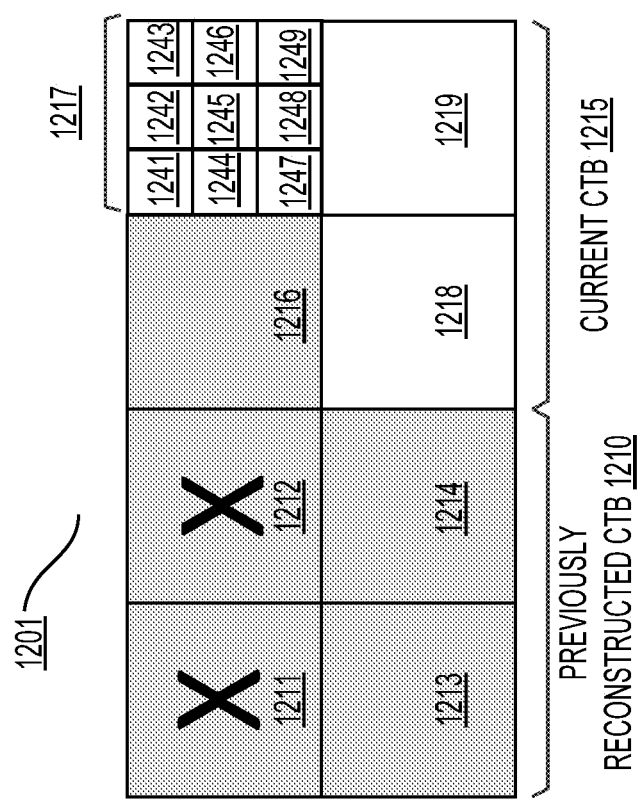

Referring to FIG. 12B, the current region (1217) is under reconstruction. The current region (1217) includes a plurality of coding blocks (1241)-(1249). The current block (1241) is to be reconstructed first in the current region (1217). The current region (1217) has a collocated region (i.e., the region (1212), in the previously reconstructed CTB (1210)). According to aspects of the disclosure, a search range for the current block (1241) excludes the collocated region (1212) where the current block (1241) is to be reconstructed first in the current region (1217). Therefore, a tight synchronization and timing control of a reference memory buffer is not necessary. The search range includes the regions (1213)-(1214) of the previously reconstructed CTB (1210) and the region (1216) in the current CTB (1215) that are reconstructed after the collocated region (1212) and before the current block (1241). The search range further excludes the region (1211) due to constraint of the reference memory size (i.e., one CTB size). Similarly, a position of the collocated region (1212) is offset by the CTB width, such as 128 samples, from a position of the current region (1217).

In the FIG. 12B example, the current region (1217) is the top right region of the current CTB (1215), the collocated region (1212) is also the top right region of the previously reconstructed CTB (1210), and the search region excludes the top right region of the previously reconstructed CTB (1210).

Figure 12C:
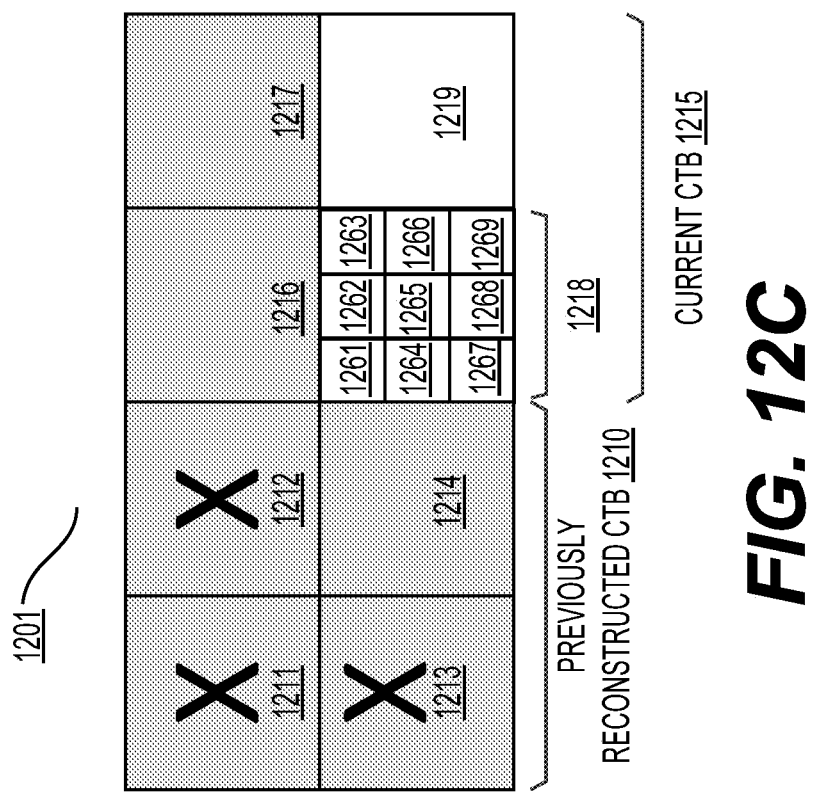

Referring to FIG. 12C, the current region (1218) is under reconstruction. The current region (1218) includes a plurality of coding blocks (1261)-(1269). The current block (1261) is to be reconstructed first in the current region (1218). The current region (1218) has a collocated region (i.e., the region (1213)), in the previously reconstructed CTB (1210). According to aspects of the disclosure, a search range for the current block (1261) excludes the collocated region (1213) where the current block (1261) is to be reconstructed first in the current region (1218). Therefore, a tight synchronization and timing control of a reference memory buffer is not necessary. The search range includes the region (1214) of the previously reconstructed CTB (1210) and the regions (1216)-(1217) in the current CTB (1215) that are reconstructed after the collocated region (1213) and before the current block (1261). Similarly, the search range further excludes the regions (1211)-(1212) due to constraint of the reference memory size. A position of the collocated region (1213) is offset by the CTB width, such as 128 samples, from a position of the current region (1218). In the FIG. 12C example, when the current region (1218) is the bottom left region of the current CTB (1215), the collocated region (1213) is also the bottom left region of the previously reconstructed CTB (1210) and the search region excludes the bottom left region of the previously reconstructed CTB (1210).

Figure 12D:
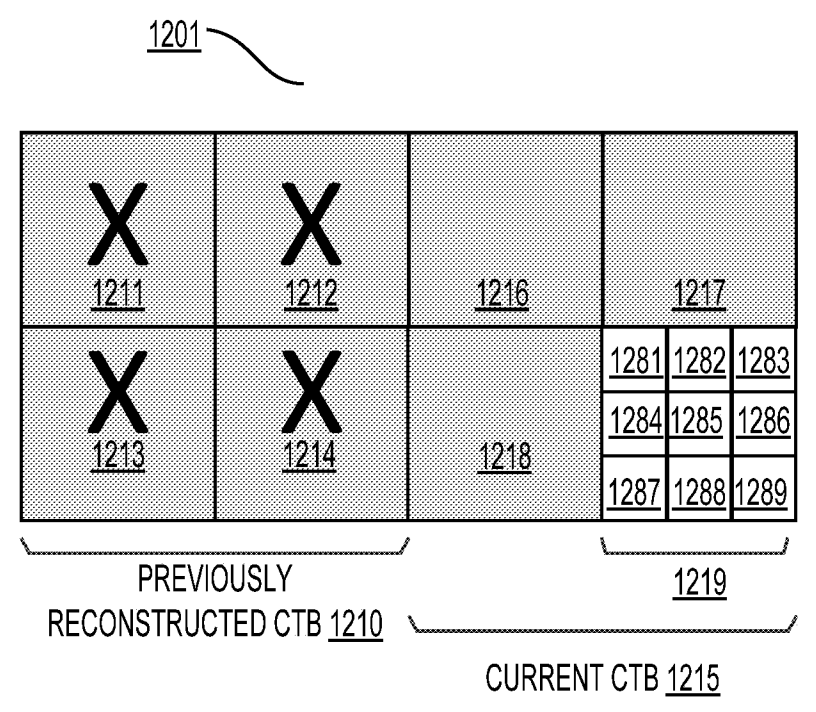

Referring to FIG. 12D, the current region (1219) is under reconstruction. The current region (1219) includes a plurality of coding blocks (1281)-(1289). The current block (1281) is to be reconstructed first in the current region (1219). The current region (1219) has a collocated region (i.e., the region (1214)), in the previously reconstructed CTB (1210). According to aspects of the disclosure, a search range for the current block (1281) excludes the collocated region (1214) where the current block (1281) is to be reconstructed first in the current region (1219). Therefore, a tight synchronization and timing control of a reference memory buffer is not necessary. The search range includes the regions (1216)-(1218) in the current CTB (1215) that are reconstructed after the collocated region (1214) and before the current block (1281) in a decoding order. The search range excludes the regions (1211)-(1213) due to constraint of the reference memory size, and thus, the search range excludes the previously reconstructed CTB (1210). Similarly, a position of the collocated region (1214) is offset by the CTB width, such as 128 samples, from a position of the current region (1219). In the FIG. 12D example, when the current region (1219) is the bottom right region of the current CTB (1215), the collocated region (1214) is also the bottom right region of the previously reconstructed CTB (1210) and the search region excludes the bottom right region of the previously reconstructed CTB (1210).

As described above with reference to FIGS. 12A-12D, a search range and a block vector mvL of a current block satisfy the modified fourth conditions where the current block is to be reconstructed first in a current region of a current CTB. In some embodiments, the modified fourth conditions are specified as: when $(xCb+(mvL[0]>>4))>>Ctb\_Log2SizeY$ is equal to $(xCb>>Ctb\_Log2SizeY)-1$, the derivation process for reference block availability is invoked with the position of the current block (xCurr, yCurr) set to be (xCb, yCb) and a position $(((xCb+(mvL[0]>>4)+CtbSizeY)>>(Ctb\_Log2SizeY-1))<<(Ctb\_Log2SizeY-1)$, $((yCb+(mvL[1]>>4))>>(Ctb\_Log2SizeY-1))<<(Ctb\_Log2SizeY-1))$ as inputs, an output is equal to FALSE indicating that the collocated region is not reconstructed.

Further, the modified fourth conditions include an additional condition: a position $(((xCb+(mvL[0]>>4)+CtbSizeY)>>(Ctb\_Log2SizeY-1))<<(Ctb\_Log2SizeY-1)$, $((yCb+(mvL[1]>>4))>>(Ctb\_Log2SizeY-1))<<(Ctb\_Log2SizeY-1))$ is not equal to (xCb, yCb). As described with reference to FIG. 10, a position of a top left sample of the current block is represented by (xCb, yCb), a position of a top left sample of a reference block is represented by $(xCb+(mvL[0]>>4), yCb+(mvL[1]>>4))$, and thus, a position of a top left sample of a collocated region of the reference block is represented by the position $(((xCb+(mvL[0]>>4)+CtbSizeY)>>(Ctb\_Log2SizeY-1))<<(Ctb\_Log2SizeY-1)$, $((yCb+(mvL[1]>>4))>>(Ctb\_Log2SizeY-1))<<(Ctb\_Log2SizeY-1))$, where the collocated region of the reference block is in the current CTB. The additional condition ensures that the position of the top left sample of the collocated region of the reference block is not equal to the position of the top left sample of the current block. In this regard, when the current block is to be reconstructed first in the current region, the reference block cannot be in a collocated region of the current region. Otherwise, the additional condition is not satisfied. Accordingly, the search range excludes the collocated region of the current region.

In the examples illustrated in FIGS. 12A-12D, the search range and the block vector also satisfy the first, the second, and the third conditions described with reference to FIG. 10.

As described above, when a current block is to be reconstructed first in a current region of a current CTB, a search range can exclude a collocated region of the current region that is in a previously reconstructed CTB where the current CTB and the previously reconstructed CTB are in a same current picture. According to aspects of the disclosure, when a CTB size is less than a reference memory size, a position of the collocated region can be offset by multiples of the CTB width from a position of the current region, and coding blocks in the search range are in at least one of: the current CTB, the previously reconstructed CTB, and one or more reconstructed CTBs between the current CTB and the previously reconstructed CTB. The descriptions with reference to FIGS. 12A-12D can be suitably adapted when the CTB size is less than the reference memory size such as shown in FIG. 13.

Figure 13:
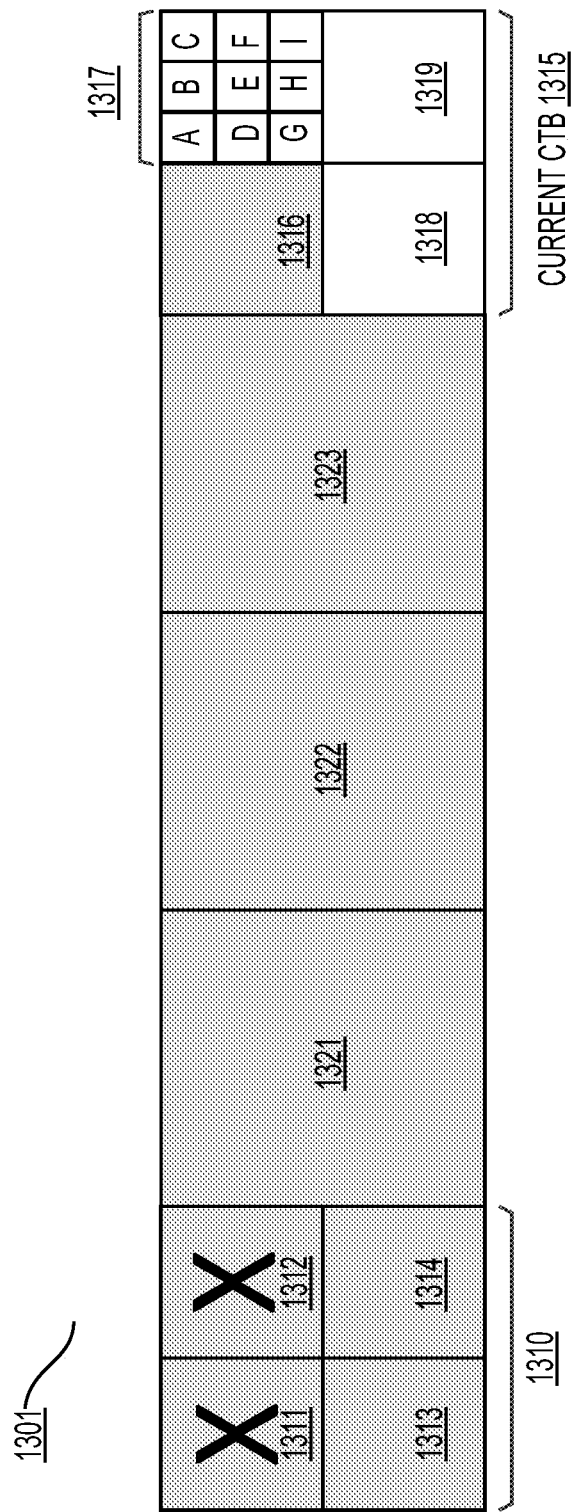
FIG. 13 shows an example of intra block copy having a search range that is larger than a CTB size according to an embodiment of the disclosure.

FIG. 13 shows an example of intra block copy having a search range that is larger than a CTB size according to an embodiment of the disclosure. A current picture (1301) includes a current CTB (1315) under reconstruction and multiple previously reconstructed CTBs (1310) and (1321)-(1323). CTBs in the current picture (1301) have a CTB size and a CTB width. The current CTB (1315) includes 4 regions (1316)-(1319). Similarly, the previously reconstructed CTB (1310) includes 4 regions (1311)-(1314). In an example, a reference memory size is 128×128 samples and can be equal to a maximum CTB size, the CTB size being smaller than the reference memory size or the maximum CTB size is 64 by 64 samples, and each of the regions (1311)-(1314) and (1316)-(1319) has a size of 32 by 32 samples. A ratio N is a ratio of the reference memory size over the CTB size.

The current CTB (1315) includes a top left region, a top right region, a bottom left region, and a bottom right region that correspond to the regions (1316)-(1319), respectively. The previously reconstructed CTB (1310) includes a top left region, a top right region, a bottom left region, and a bottom right region that correspond to the regions (1311)-(1314), respectively.

The current region (1317) is under reconstruction. The current region (1317) includes a plurality of coding blocks A-I. The current block A is to be reconstructed first in the current region (1317). The current region (1317) has a collocated region (1312) in the previously reconstructed CTB (1310). According to aspects of the disclosure, a search range for the current block A excludes the collocated region (1312). The search range includes the regions (1313)-(1314) of the previously reconstructed CTB (1310), the CTBs (1321)-(1323), and the region (1316) that are reconstructed after the collocated region (1312) and before the current block A. Therefore, a left most CTB that the search range can include is offset by N of the CTB width from the current CTB (1315). A position of the collocated region (1312) is also offset by N of the CTB width from a position of the current region (1317). In the FIG. 13 example, the ratio N is 4, the left most CTB is the previously reconstructed CTB (1310) that is offset by 4 of the CTB width from the current CTB (1315). The position of the collocated region (1312) is left shifted by 256 samples, i.e., 4 of the CTB width (64 samples), from the position of the current region (1317).

As shown in the FIG. 13 example, when the current region (1317) is the top right region of the current CTB (1315), the collocated region (1312) is also the top right region of the previously reconstructed CTB (1310) and the search region excludes the top right region of the previously reconstructed CTB (1310).

The descriptions with reference to FIG. 13 can be suitably adapted when a current block is to be reconstructed first in another region, such as the region (1316), the region (1318), or the region (1319). For purposes of brevity, the detailed description is omitted.

When a CTB size is smaller than a reference memory size, for example, the CTB size is 64×64 samples and the reference memory size is 128×128 samples, different embodiments other than the FIG. 13 example can be implemented as below. In the embodiments below, a current block to be reconstructed using the IBC mode is in a current region of a current CTB under reconstruction. A reference block of the current block is in a search range. The ratio N of the reference memory size over the CTB size is larger than 1. N previously reconstructed CTBs are left shifted by N, (N−1), . . . , and 1 of the CTB width from the current CTB, respectively. The search range can include at least one of: the current CTB, a left most CTB (i.e., the CTB left shifted by N of the CTB width), and (N−1) previously reconstructed CTBs (also referred to as the (N−1) CTBs) between the left most CTB and the current CTB.

In a first embodiment, the search range for the current block is within the current CTB and a previously reconstructed CTB that is a left neighbor of the current CTB. Because the reference memory size is at least 2 of the CTB size, each coding block of the left neighbor can be available as the reference block, and thus, no additional check for reference block availability is necessary. In an example, the current block is reconstructed first in the current region. In an example, the current block is reconstructed after a previously reconstructed coding block in the current region.

In a second embodiment, the search range is extended to include the (N−1) CTBs between the left most CTB and the current CTB. Accordingly, the search range includes the (N−1) CTBs and excludes the left most CTB. The search range can further include reconstructed portion in the current CTB. Because the reference memory size is N of the CTB size, a size of the search range is within the reference memory size, and thus, no additional check for reference block availability is necessary when the (N−1) CTBs and the current CTB are in a same tile, a same slice, or the like. Referring to FIG. 13, the ratio N is 4, the search range includes 3 previously reconstructed CTBs (i.e., the previously reconstructed CTBs (1321)-(1323) between the left most CTB (1310) and the current CTB (1315)). The previously reconstructed CTBs (1321)-(1323) are fully available for reference, for example, if the previously reconstructed CTBs (1321)-(1323) and the current CTB (1315) are in a same tile or slice, and thus, no additional check for reference block availability is necessary.

In a third embodiment, the search range is extended to have the N previously reconstructed CTBs including the left most CTB, and specific handling may be necessary. The current CTB and the left most CTB can be divided into 4 regions of an equal size. In an example, the 4 regions are square regions. Depending on which of the regions the current block is located, a part of the left most CTB may or may not be available for reference, for example, similar to description with reference to FIGS. 10, 11, and 12A-D.

In a first example of the third embodiment, the search range and a block vector for the current block satisfy constraints that are suitably adapted from the constraints described with reference to FIG. 10. For example, the modified constraints include the first conditions, the second conditions, modified third conditions, and modified fourth conditions. The modified third conditions can be specified as below:

$$(yCb+(mvL[1]>>4))>>Ctb \text{ Log } 2SizeY=yCb>>Ctb \text{ Log } 2SizeY \quad (1)$$

$$(yCb+(mvL[1]>>4+cbHeight-1)>>Ctb \text{ Log } 2SizeY=yCb>>Ctb \text{ Log } 2Size \quad (2)$$

$$(xCb+(mvL[0]>>4))>>Ctb \text{ Log } 2SizeY>=(xCb>>Ctb \text{ Log } 2SizeY)-1<<((MaxCtb \text{ Log } 2SizeY-Ctb \text{ Log } 2SizeY)<<1)) \quad (5)$$

$$(xCb+(mvL[0]>>4)+cbWidth-1)>>Ctg \text{ Log } 2SizeY<=(xCb>>Ctg \text{ Log } 2SizeY) \quad (4)$$

where Eqs. (1)-(2) and (4) remain identical to those in the third conditions and Eq. (5) replaces Eq. (3) in the third conditions. The parameter MaxCtb Log 2SizeY represents the maximum CTB size or the reference memory size in a log 2 form. As described above, the search range can include N previously reconstructed CTBs, such as the left most CTB (1310) that is offset by N of the CTB width from the current CTB (1315) and (N−1) CTBs that are between the left most CTB (1310) and the current CTB (1315) in the FIG. 13 example. Eqs. (4)-(5) constrain the reference block to be within one of: the left most CTB (1310), the current CTB (1315), and the (N−1) CTBs (1321)-(1323).

The modified fourth conditions can specify that when the reference block is in the left most CTB (1310), a collocated region for the reference block is not reconstructed (i.e., no samples in the collocated region have been reconstructed where the collocated region for the reference block is in the current CTB (1315)). The collocated region for the reference block is offset by N of the CTB width from a region where the reference block is located. For example, the modified fourth conditions can be specified as below: when (xCb+(mvL[0]>>4))>>Ctb Log 2SizeY is equal to (xCb>>Ctg Log 2SizeY)−1<<((MaxCtb Log 2SizeY−Ctb Log 2SizeY)<<1)), the derivation process for reference block availability is invoked with a position of a top left sample of the current block (xCurr, yCurr) set to be (xCb, yCb) and a position (((xCb+(mvL[0]>>4)+N CtbSizeY)>>(Ctb Log 2SizeY−1))<<(Ctb Log 2SizeY−1), ((yCb+(mvL[1]>>4))>>(Ctb Log 2SizeY−1))<<(Ctb Log 2SizeY−1)) as inputs, an output is equal to FALSE indicating that the collocated region for the reference block is not reconstructed.

In a second example of the third embodiment, the search range and the block vector for the current block satisfy constraints that are suitably adapted from the constraints described with reference to FIG. 10. For example, the modified constraints include the first conditions, the second conditions, modified third conditions, and modified fourth conditions. The modified third conditions can be identical to that described with reference to the first example of the third embodiment, and thus, detailed descriptions are omitted for purposes of brevity. The modified fourth conditions include the modified fourth conditions described with reference to the first example of the third embodiment. Further, the modified fourth conditions include an additional condition below: when Ctb Log 2SizeY is equal to MaxCtb Log 2SizeY, a position (((xCb+(mvL[0]>>4)+CtbSizeY)>>(Ctb Log 2SizeY−1))<<(Ctb Log 2SizeY−1), ((yCb+(mvL[1]>>4))>>(Ctb Log 2SizeY−1))<<(Ctb Log 2SizeY−1)) is not equal to (xCb, yCb). The additional condition ensures that a position of the collocated region of the reference block is not equal to a position of the current block. In this regard, when the current block is to be reconstructed first in the current region, the reference block cannot be in a collocated region of the current region. Accordingly, the search range excludes the collocated region of the current region.

In a fourth embodiment, the left most CTB is set to be not available for reference, and thus, the search range excludes the left most CTB. Therefore, the search range can include a reconstructed part of the current CTB and the (N−1) CTBs between the left most CTB and the current CTB, similar to the second embodiment.

In a first example of the fourth embodiment, the search range and the block vector for the current block satisfy constraints that are suitably adapted from the constraints described with reference to FIG. 10. For example, the modified constraints include the first conditions, the second conditions, modified third conditions, and modified fourth conditions. The modified third conditions can be specified as below:

$$(yCb+(mvL[1]>>4))>>Ctb \text{ Log } 2SizeY = yCb>>Ctb \text{ Log } 2SizeY \quad (1)$$

$$(yCb+(mvL[1]>>4+cbHeight-1))>>Ctb \text{ Log } 2SizeY = yCb>>Ctb \text{ Log } 2Size \quad (2)$$

$$(xCb+(mvL[0]>>4))>>Ctb \text{ Log } 2SizeY >= (xCb>>Ctb \text{ Log } 2SizeY)-1<<((7-Ctb \text{ Log } 2SizeY)<<1)+ \text{Min}(1,MaxCtb \text{ Log } 2SizeY-Ctb \text{ Log } 2SizeY) \quad (6)$$

$$(xCb+(mvL[0]>>4)+cbWidth-1)>>Ctb \text{ Log } 2SizeY<=(xCb>>Ctg \text{ Log } 2SizeY) \quad (4)$$

where Eqs. (1)-(2) and (4) remain identical to those in the third conditions and Eq. (6) replaces Eq. (3) in the third conditions. Eqs. (4) and (6) constrain the reference block to be within one of: the current CTB and the (N−1) CTBs.

The modified fourth conditions can specify that when the reference block is in the left neighbor of the current CTB and the CTB size is the maximum CTB size (also the reference memory size), a collocated region for the reference block is not reconstructed (i.e., no samples in the collocated region have been reconstructed where the collocated region for the reference block is in the current CTB). For example, the modified fourth conditions can be specified as below: when (xCb+(mvL[0]>>4))>>Ctb Log 2SizeY is equal to (xCb>>Ctb Log 2SizeY)−1 and Ctb Log 2SizeY is equal to MaxCtb Log 2SizeY, the derivation process for reference block availability is invoked with a position of a top left sample of the current block (xCurr, yCurr) set to be (xCb, yCb) and a position (((xCb+(mvL[0]>>4)+CtbSizeY)>>(Ctb Log 2SizeY−1)) (Ctb Log 2SizeY−1), ((yCb+(mvL[1]>>4))>>(Ctb Log 2SizeY−1))<<(Ctb Log 2SizeY−1)) as inputs, an output is equal to FALSE indicating that the collocated region for the reference block is not reconstructed.

In a second example of the fourth embodiment, the search range and the block vector for the current block satisfy constraints that are suitably adapted from the constraints described with reference to FIG. 10. For example, the modified constraints include the first conditions, the second conditions, modified third conditions, and modified fourth conditions. The modified third conditions can be identical to the modified third conditions of the first example of the fourth embodiment that constrain the reference block to be within one of: the current CTB and the (N−1) CTBs.

The modified fourth conditions include the modified fourth conditions of the first example of the fourth embodiment. Therefore, when the reference block is in the left neighbor of the current CTB and the CTB size is the maximum CTB size (also the reference memory size), a collocated region for the reference block is not reconstructed (i.e., no samples in the collocated region have been reconstructed where the collocated region for the reference block is in the current CTB). Further, the modified fourth conditions include an additional condition as below: when Ctb Log 2SizeY is equal to MaxCtb Log 2SizeY, a position (((xCb+(mvL[0]>>4)+CtbSizeY)>>(Ctb Log 2SizeY−1))<<(Ctb Log 2SizeY−1), ((yCb+(mvL[1]>>4))>>(Ctb Log 2SizeY−1))<<(Ctb Log 2SizeY−1)) is not equal to (xCb, yCb). The additional condition ensures that a position of the collocated region of the reference block is not equal to a position of the current block. In this regard, when the current block is to be reconstructed first in the current region, the reference block cannot be in a collocated region of the current region. Accordingly, the search range excludes the collocated region of the current region.

In the above descriptions, a CTB can include 4 regions. For example, the current CTB 1015 includes the regions (1016-1019). The descriptions can be suitably adapted to scenarios where a CTB includes any suitable number of regions, and the number can be a positive integer. In addition, the regions can have any suitable size and shape including rectangles, squares, or the like. In an example, a size of the regions can be determined based on a reference memory size, a unit size for memory, and/or the like. In the examples described above, a region can include 9 coding blocks. In general, a region can include any suitable number of coding blocks, and the description can be suitably adapted.

Figure 14:
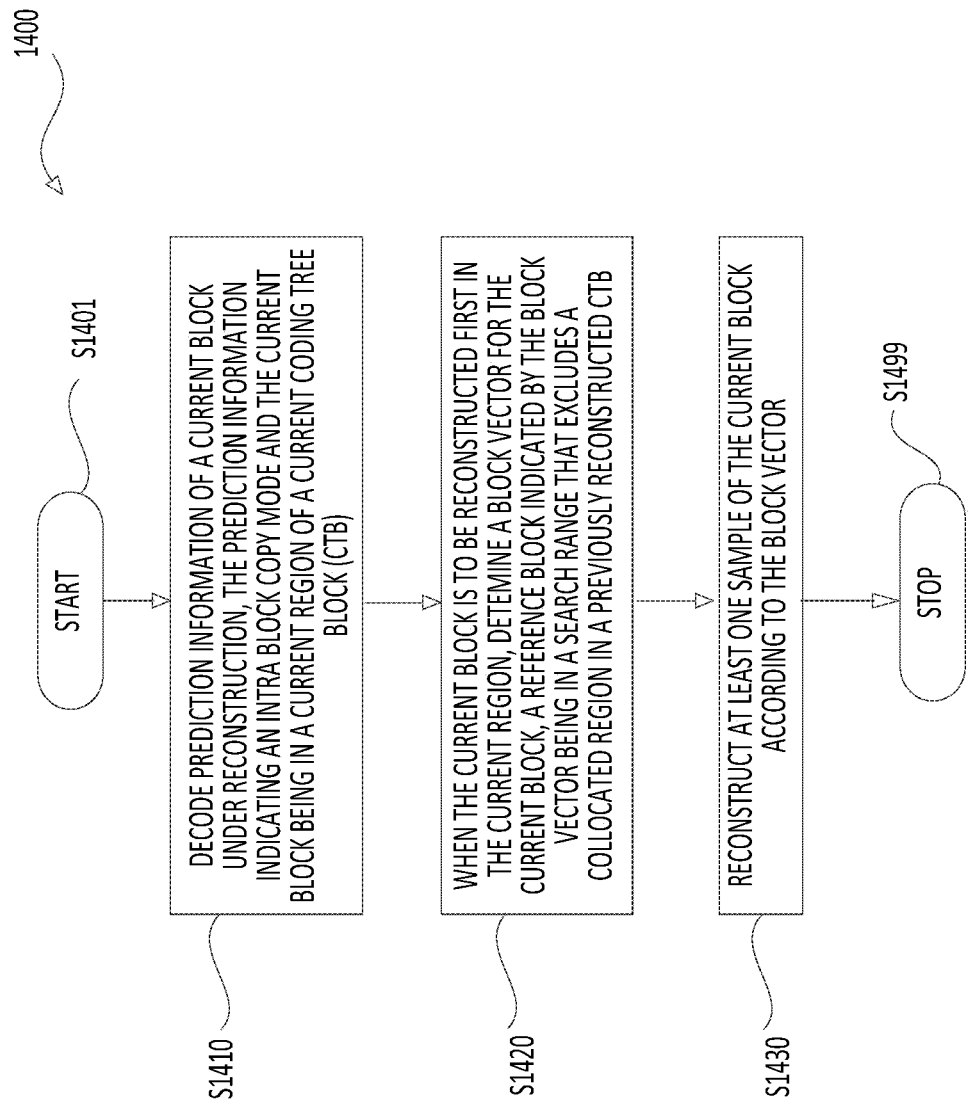
FIG. 14 shows a flow chart outlining a process (1400) according to an embodiment of the disclosure.

FIG. 14 shows a flow chart outlining a process (1400) according to an embodiment of the disclosure. The process (1400) can be used in the reconstruction of a current block coded in intra block copy mode, so to generate a reference block for the block under reconstruction. In various embodiments, the process (1400) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1400) is implemented in software instructions, thus when the processing circuitry executes the software instructions, the processing circuitry performs the process (1400). The process starts at (S1401) and proceeds to (S1410).

At (S1410), prediction information of the current block is decoded from a coded video bitstream. The prediction information indicates the intra block copy mode. The current block is one of a plurality of coding blocks in a current region of a current CTB in a current picture.

At (S1420), when the current block is to be reconstructed first in the current region, a block vector is determined for the current block where a reference block indicated by the block vector is in a search range that excludes a collocated region in a previously reconstructed CTB. As described above with reference to FIGS. 10, 11, 12A-12D, and 13, a position of the collocated region in the previously reconstructed CTB having a same relative position as the current region in the current CTB.

The search range is in the current picture. In an embodiment, the search range includes coding blocks that are reconstructed after the collocated region and before the current block.

In an embodiment, a CTB size can be compared with a reference memory size. In an example, when the CTB size is equal to the reference memory size, the previously reconstructed CTB is a left neighbor of the current CTB, the position of the collocated region is offset by a width of the current CTB from a position of the current region, and the coding blocks in the search range are in at least one of: the current CTB and the previously reconstructed CTB. In an example, the size of the current CTB and the previously reconstructed CTB is 128 by 128 samples, the current CTB includes 4 regions of 64 by 64 samples, the previously reconstructed CTB includes 4 regions of 64 by 64 samples, the position of the collocated region is offset by 128 samples from the position of the current region, the current region being one of the 4 regions in the current CTB and the collocated region being one of the 4 regions in the previously reconstructed CTB.

In an example, the CTB size is less than the reference memory size, and a ratio N between the reference memory size over the CTB size is larger than 1. Accordingly, the position of the collocated region is offset by N of the CTB width from a position of the current region, and the coding blocks in the search range are in at least one of: the current CTB, the left most previously reconstructed CTB that is left shifted by N of the CTB width from the current CTB, and (N−1) reconstructed CTBs between the current CTB and the left most previously reconstructed CTB. For example, the CTB size is 64×64 samples, the reference memory size is 128×128 samples, the current CTB includes 4 regions of 32×32 samples, the previously reconstructed CTB includes 4 regions of 32×32 samples, the position of the collocated region is offset by 256 samples from the position of the current region.

Alternatively, when the CTB size is less than the reference memory size, the search range excludes the left most previously reconstructed CTB. In an example, the search range can include the (N−1) reconstructed CTBs and reconstructed part of the current CTB.

At (S1430), at least one sample of the current block is reconstructed according to the block vector. In an example, the reference block is obtained using the block vector, and the at least one sample is obtained from the reference block. Then the process (1400) proceeds to (S1499) and terminates.

The process (1400) can be suitably adapted to various scenarios, for example, when the current CTB includes a number of regions that is different from 4 regions. In an embodiment, the process (1400) can also be used to reconstruct a coding block that is reconstructed after another coding block in the current region.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
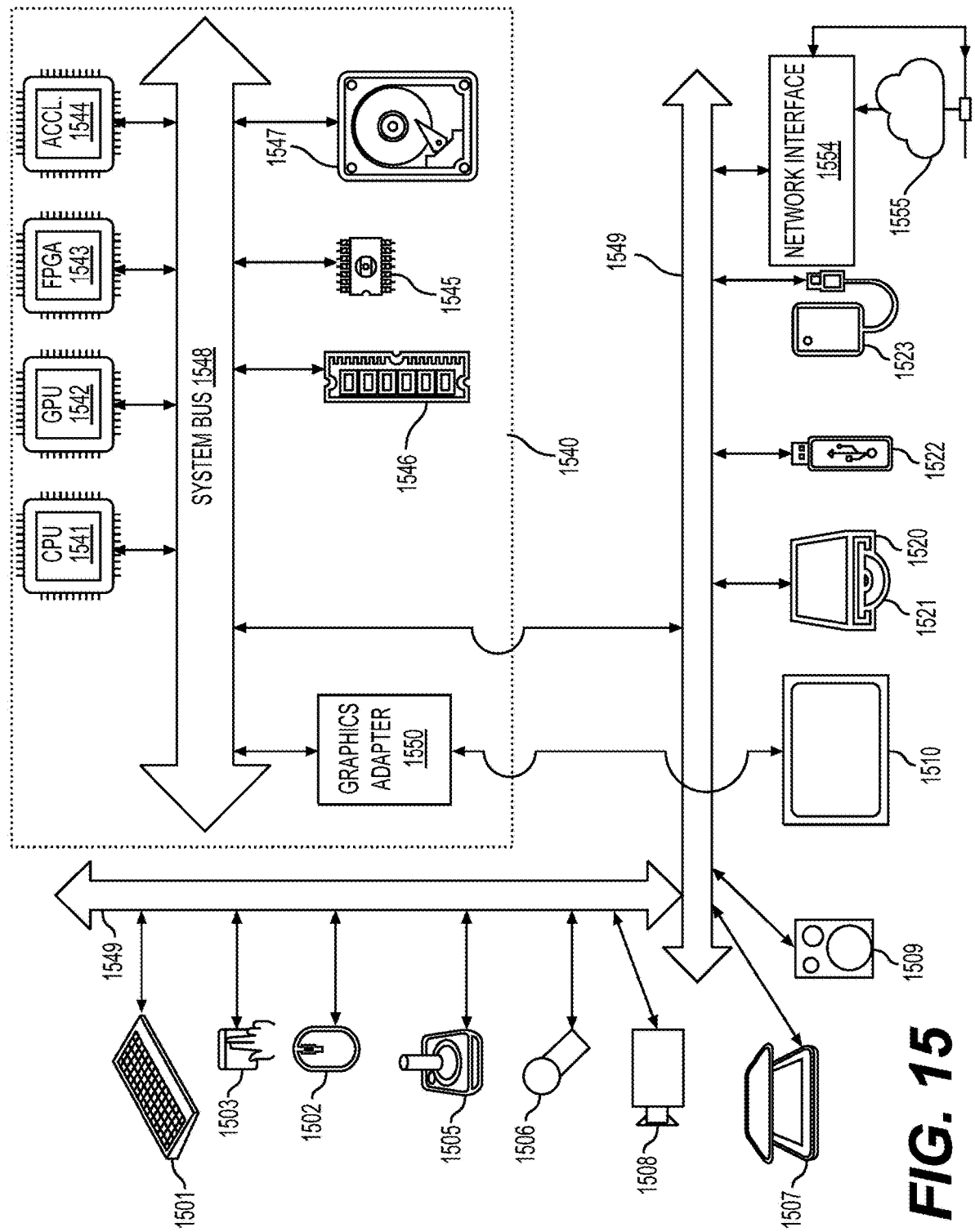
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
SCC: Screen Content Coding
VTM: Versatile test model
BV: Block Vector
AMVP: Advanced Motion Vector Prediction
CPR: Current Picture Referencing
IBC: Intra Block Copy
DPB: Decoder Picture Buffer While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding, comprising:
generating prediction information of a current block of video data, the prediction information being indicative of an intra block copy mode, the current block being one of a plurality of coding blocks in a current region, out of all regions, of a current coding tree block (CTB) in a current picture;
encoding the current block of video data; and
generating a bitstream that includes the encoded block of video data and the prediction information,
wherein the current block of video data is encoded with a block vector for the current block, a reference block indicated by the block vector being configured to be within a range that excludes a collocated region in a previously encoded CTB, a position of the collocated region in the previously encoded CTB having a same relative position as the current region in the current CTB, the range being in the current picture,
wherein the range includes coding blocks that are encoded before the current block in the current CTB or coding blocks that are not excluded in the previously encoded CTB,
wherein a size of the current CTB is less than or equal to a reference memory size, the previously encoded CTB is a left immediately adjacent neighbor of the current CTB, the position of the collocated region is offset by a width of the current CTB from a position of the current region,
wherein the coding blocks in the range include at least all remaining regions of the previously encoded CTB that have not been excluded from the range when the current region is not a final region to be encoded in the current CTB, and
wherein each of the regions of the current CTB is sequentially reconstructed by updating a search range to newly exclude a collocated region in the previously reconstructed CTB when the current region changes.

2. The method of claim 1, wherein the size of the current CTB and a size of the previously encoded CTB is 128 by 128 samples, the current CTB includes 4 regions of 64 by 64 samples, the previously encoded CTB includes 4 regions of 64 by 64 samples, the position of the collocated region is offset by 128 samples from the position of the current region, the current region being one of the 4 regions in the current CTB and the collocated region being one of the 4 regions in the previously encoded CTB.

3. The method of claim 2, wherein
the 4 regions in the current CTB includes a top left region, a top right region, a bottom left region, and a bottom right region; and
the 4 regions in the previously encoded CTB includes a top left region, a top right region, a bottom left region, and a bottom right region.

4. The method of claim 1, wherein the current CTB includes 4 regions having a same size and shape, the previously encoded CTB includes 4 regions having the same size and the shape, the current region is one of the 4 regions in the current CTB, and the collocated region is one of the 4 regions in the previously encoded CTB.

5. The method of claim 1, wherein the size of the current CTB is less than the reference memory size, the position of the collocated region is offset by multiple widths of the current CTB from the position of the current region, and the coding blocks in the range are in at least one of: the current CTB, the previously encoded CTB, and one or more encoded CTBs between the current CTB and the previously encoded CTB.

6. The method of claim 5, wherein the size of the current CTB is 64×64 samples, the reference memory size is 128×128 samples, the current CTB includes 4 regions of 32×32 samples, the previously encoded CTB includes 4 regions of 32×32 samples, the position of the collocated region is offset by 256 samples from the position of the current region.

7. The method of claim 5, wherein the range excludes the previously encoded CTB that is offset by N widths of the current CTB from the current CTB and N is a ratio of the reference memory size over the size of the current CTB.

8. The method of claim 1, wherein the coding blocks in the range include only regions in the current CTB that are encoded immediately after the collocated region when the current region is the final region to be encoded in the current CTB.

9. An apparatus for video encoding, comprising:
processing circuitry configured to:
generate prediction information of a current block of video data, the prediction information being indicative of an intra block copy mode, the current block being one of a plurality of coding blocks in a current region, out of all regions, of a current coding tree block (CTB) in a current picture;
encode the current block of video data; and
generate a bitstream that includes the encoded block of video data and the prediction information,
wherein the current block of video data is encoded with a block vector for the current block, a reference block indicated by the block vector being configured to be within a range that excludes a collocated region in a previously encoded CTB, a position of the collocated region in the previously encoded CTB having a same relative position as the current region in the current CTB, the range being in the current picture,
wherein the range includes coding blocks that are encoded before the current block in the current CTB or coding blocks that are not excluded in the previously encoded CTB,
wherein a size of the current CTB is less than or equal to a reference memory size, the previously encoded CTB is a left immediately adjacent neighbor of the current CTB, the position of the collocated region is offset by a width of the current CTB from a position of the current region,
wherein the coding blocks in the range include at least all remaining regions of the previously encoded CTB that have not been excluded from the range when the current region is not a final region to be encoded in the current CTB, and
wherein each of the regions of the current CTB is sequentially reconstructed by updating a search range to newly exclude a collocated region in the previously reconstructed CTB when the current region changes.

10. The apparatus according to claim 9, wherein the size of the current CTB and a size of the previously encoded CTB is 128 by 128 samples, the current CTB includes 4 regions of 64 by 64 samples, the previously encoded CTB includes 4 regions of 64 by 64 samples, the position of the collocated region is offset by 128 samples from the position of the current region, the current region being one of the 4 regions in the current CTB and the collocated region being one of the 4 regions in the previously encoded CTB.

11. The apparatus according to claim 9, wherein
the 4 regions in the current CTB includes a top left region, a top right region, a bottom left region, and a bottom right region; and
the 4 regions in the previously encoded CTB includes a top left region, a top right region, a bottom left region, and a bottom right region.

12. The apparatus according to claim 9, wherein the current CTB includes 4 regions having a same size and shape, the previously encoded CTB includes 4 regions having the same size and the shape, the current region is one of the 4 regions in the current CTB, and the collocated region is one of the 4 regions in the previously encoded CTB.

13. The apparatus according to claim 9, wherein the size of the current CTB is less than the reference memory size, the position of the collocated region is offset by multiple widths of the current CTB from the position of the current region, and the coding blocks in the range are in at least one of: the current CTB, the previously encoded CTB, and one or more encoded CTBs between the current CTB and the previously encoded CTB.

14. The apparatus according to claim 9, wherein the size of the current CTB is 64×64 samples, the reference memory size is 128×128 samples, the current CTB includes 4 regions of 32×32 samples, the previously encoded CTB includes 4 regions of 32×32 samples, the position of the collocated region is offset by 256 samples from the position of the current region.

15. The apparatus according to claim 9, wherein the range excludes the previously encoded CTB that is offset by N widths of the current CTB from the current CTB and N is a ratio of the reference memory size over the size of the current CTB.

16. The apparatus according to claim 9, wherein the coding blocks in the range include only regions in the current CTB that are encoded immediately after the collocated region when the current region is the final region to be encoded in the current CTB.

* * * * *